(12) United States Patent
Del Sesto

(10) Patent No.: US 6,985,882 B1
(45) Date of Patent: Jan. 10, 2006

(54) METHOD AND SYSTEM FOR SELLING AND PURCHASING MEDIA ADVERTISING OVER A DISTRIBUTED COMMUNICATION NETWORK

(75) Inventor: Justin Del Sesto, Washington, DC (US)

(73) Assignee: DirectRep, LLC, Washington, DC (US)

( * ) Notice: Subject to any disclaimer, the term of this patent is extended or adjusted under 35 U.S.C. 154(b) by 1029 days.

(21) Appl. No.: 09/245,222

(22) Filed: Feb. 5, 1999

(51) Int. Cl.
*G06F 17/60* (2006.01)
*H04N 5/445* (2006.01)

(52) U.S. Cl. .............................. 705/37; 705/26; 705/27; 725/51

(58) Field of Classification Search .................... 705/37, 705/26, 74, 77, 1, 27, 40, 400; 707/3, 100; 715/719, 737; 725/2, 4, 13, 39, 44, 46, 47, 725/51, 52, 53, 60
See application file for complete search history.

(56) References Cited

U.S. PATENT DOCUMENTS

| | | | |
|---|---|---|---|
| 5,168,446 A | * 12/1992 | Wiseman | 364/408 |
| 5,220,501 A | 6/1993 | Lawlor et al. | 705/40 |
| 5,227,778 A | 7/1993 | Vacon et al. | 340/825.52 |
| 5,584,025 A | 12/1996 | Keithley et al. | 707/104.1 |
| 5,592,375 A | 1/1997 | Salmon et al. | 705/7 |
| 5,621,734 A | 4/1997 | Mann et al. | 714/746 |
| 5,664,948 A | 9/1997 | Dimitriadis et al. | 434/307 R |
| 5,671,411 A | 9/1997 | Watts et al. | 725/43 |
| 5,697,844 A | 12/1997 | Von Kohorn | 463/40 |
| 5,715,402 A | 2/1998 | Popolo | 705/37 |
| 5,724,521 A | 3/1998 | Dedrick | 705/26 |
| 5,737,533 A | 4/1998 | de Hond | 719/219 |
| 5,794,207 A | 8/1998 | Walker et al. | 705/1 |
| 5,959,623 A | 9/1999 | Van Hoff et al. | 715/719 |

FOREIGN PATENT DOCUMENTS

| | | | |
|---|---|---|---|
| WO | 9605563 A1 | | 2/1996 |
| WO | 9605563 A | * | 2/1996 |

OTHER PUBLICATIONS

J.T. Russell and W.R. Lane, Advertising Procedure, 1996, Prentice Hall, Chapter 7, pp. 186–188.*
T.C. O'Guinn, C.T. Allen and R.J. Semenik, Advertising, 1998, South–Western College Publishing, pp. 385–391.*
B.R. Lewisand D. Litter, The Blackwell Encyclopedic Dictionary of Marketing, 1997, Blackwell Business, pp. 133 and 134.*
G.E. Belch and M.A. Belch, Advertising and Promotion, 4th. edition, 1998, Chapter 10, pp. 297–303, 324, 325 and 718.*
V. O'Connell, Chrysler Drives Away From Focus on TV, The Wall Street Journal, p. B14, May 31, 2001.*
Internet Business, Ad Services Add Comfort to Buying Process, Oct. 20, 1998.*

(Continued)

*Primary Examiner*—Ella Colbert
(74) *Attorney, Agent, or Firm*—Swidler Berlin , LLP

(57) ABSTRACT

A method and system for buying and selling media advertising units over a distributed communication network, such as the Internet, provides a server on network including a database containing information pertaining to available advertising units, such as advertising time slots in television programming schedules, provided by media content providers. The server provides buyers of the advertising units access to the database over the network, whereby buyers may search the database and make bids to the sellers for selected advertising units. Sellers of advertising units access the database over said network to enter the information, receive bids entered by buyers, accept bids, and enter contracts into the server for communication to buyers over the network.

14 Claims, 42 Drawing Sheets

OTHER PUBLICATIONS

A. S. Weiner, Advertising in the Expansion zone, American Demographics, Jul. 1, 1997.*

Lidsky, David; A Word for Our Sponsor; PC MAgazine; p40, May 27, 1997.*

Wang, Nelson; Auctioning od Ad Space Gets Boost With Successful Launch of Site; Internet World, p14, Mar. 2, 1998.*

Gibbel, S., Web Ad Networks Give Marketers a New Option, Netmarketing, Sep. 1996.

Gapper, J., Radio Turns to Internet to Boost Advertising, Financial Times, p. 18, Nov. 4, 1998.

F.K., Polygram fait la promotion d'Eric Clapton sur Internet, Economiste, No. 1004, Jul. 7, 1995, p. 47.

"Radio Turns To Internet to Boost Advertising" Financial Times, London, GB Nov. 4, 1998 by J. Gapper, Media Editor.

Wang, N: "Auctioning of Ad Space Gets Boost With Successful Launch of Site"; Internet World, Mecklermedia, Westport, CT. US, Mar. 2, 1996, p. 14.

* cited by examiner

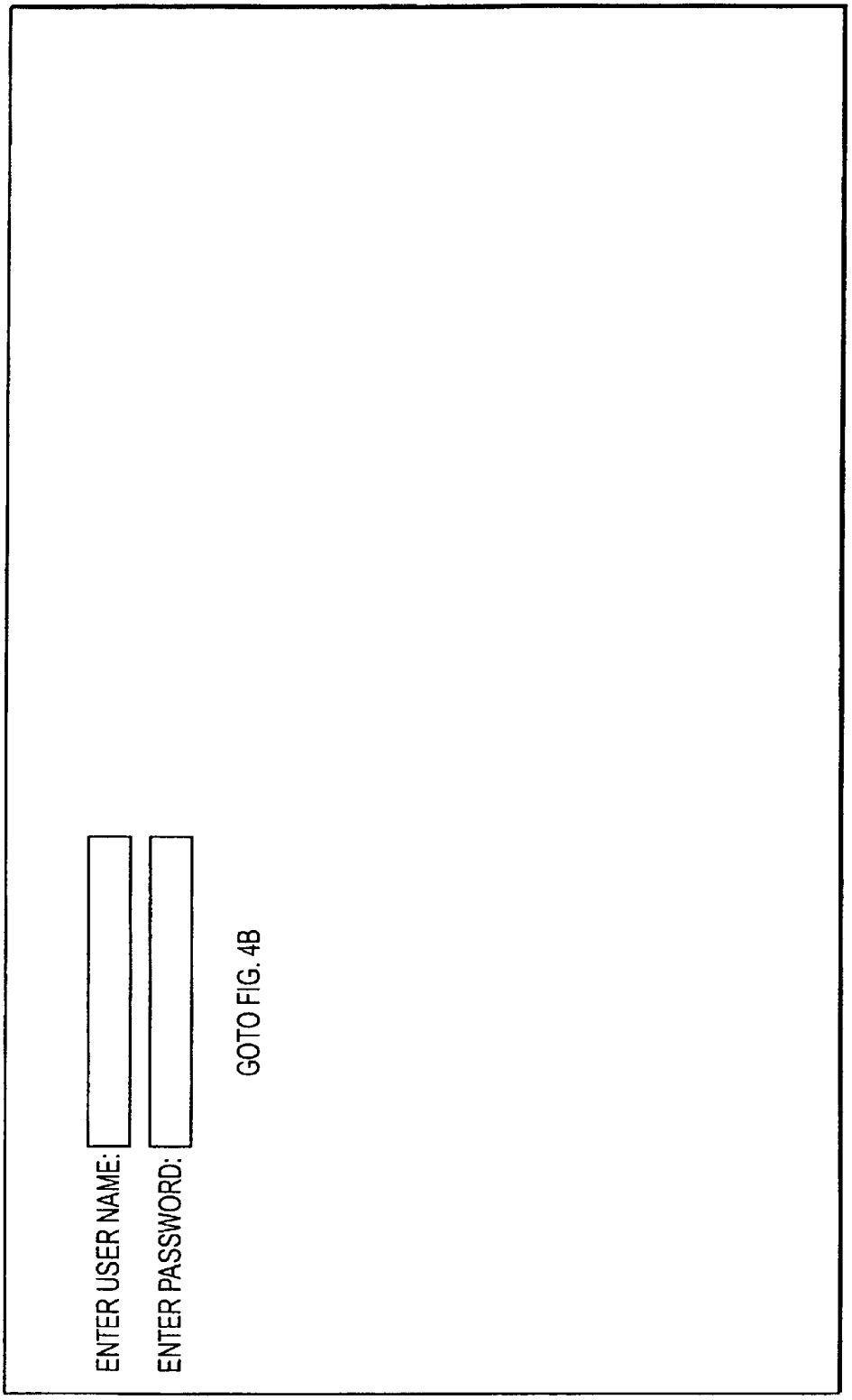

AGENCY NAME
USER NAME
CLIENT NAME
CAMPAIGN NAME
SHOPPING LIST NAME

THE FOLLOWING SEARCH YOU PREVIOUSLY DEFINED FOR THIS CAMPAIGN WILL NOW BE RUN FOR MARKET (#).* YOU MAY REFINE SEARCH PARAMETERS NOW IF YOU WISH.

FLIGHT DATES: FROM [____] TO [____]

☐ COUNTY →
☐ DAY PART 1 → ☐ DAY PART 2 →
☐ SHOW CATEGORY →
☐ PROGRAM: [____]
☐ SELECT CALC. → CALC RESULT [____]
☐ INCLUDE BUNDLED DEALS
☐ INCLUDE "LATE AVAILS"

* IF WHEN CREATING THIS SHOPPING LIST, THE USER SELECTED "MULTIPLE" FOR THE MARKET, THEY WOULD SELECT THE MARKET (OR MARKETS) HERE:

☐ MARKET →

YOU ALSO MAY SELECT A STATION(S) TO SEACH HERE:

☐ STATION →

( RUN SEARCH )  GO TO FIG. 4F

*FIG. 4E*

AGENCY NAME
USER NAME
CLIENT NAME
SHOPPING LIST NAME
SMART AGENT NAME
   SEARCH PARAMETERS:
      (MARKET,) COUNTY, STATION, DAY PART, SHOW CATEGORY, PROGRAM, DEMO, COST

GO TO FIG. 4E          ( EDIT THIS SEARCH NOW )

RE-ORDER SEARCH RESULTS BY:

( STN )  ( CNTY )  ( DP )  ( SH.CAT )  ( SHOW )  ( CALC )  ( COST )  ( LATE )  ( BNDL )

SEARCH RESULTS (FOR THE WEEK OF ##/##/## THROUGH THE WEEK OF ##/##/##) IN MARKET #:

STATION, COUNTY, DAY PART, SHOW CATEGORY, PROGRAM, CALC. RESULTS, COST, # OF AVAILS, LATE STATUS ☐ CHECK BOX

STATION, COUNTY, DAY PART, SHOW CATEGORY, PROGRAM, CALC. RESULTS, COST, # OF AVAILS, LATE STATUS ☐

STATION, COUNTY, DAY PART, SHOW CATEGORY, PROGRAM, CALC. RESULTS, COST, # OF AVAILS, LATE STATUS ☐

STATION, COUNTY, DAY PART, SHOW CATEGORY, PROGRAM, CALC. RESULTS, COST, # OF AVAILS, LATE STATUS ☐

(OR ROS OR BUNDLE NAME)     (IF CALCULATION WAS USED)     GO TO FIG. 4D     ( APPLY TO SHOPPING LIST )

(OR AVAIL STATUS LIKE TIGHT OR OPEN)

AGENCY NAME
USER NAME

SEARCH PARAMETERS:
　　MARKET, COUNTY, STATION, DAY PART, SHOW CATEGORY, SHOW NAME, DEMO, COST

RE-ORDER SEARCH RESULTS BY:

( MKT )　( CNTY )　( STN )　( DP )　( SH CAT )　( SHOW )　( DEMO )　( COST )　( LATE )　( BNDL )

SEARCH RESULTS (FOR THE WEEK OF # # / # # / # # THROUGH THE WEEK OF # # / # # ):

MARKET, COUNTY, STATION, DAY PART, SHOW CATEGORY, PROGRAM, DEMO, COST, # OF AVAILS, LATE STATUS　☐ CHECK BOX

MARKET, COUNTY, STATION, DAY PART, SHOW CATEGORY, PROGRAM, DEMO, COST, # OF AVAILS, LATE STATUS　☐

MARKET, COUNTY, STATION, DAY PART, SHOW CATEGORY, PROGRAM, DEMO, COST, # OF AVAILS, LATE STATUS　☐

( SELECT A CAMPAIGN → )　　　　　　　　　　　( SELECT A CAMPAIGN → )

( SELECT SHOPPING LIST → )　-OR-　CREATE A NEW SHOPPING LIST [ ENTER NAME ]

( APPLY TO SHOPPING LIST )　[　] GO TO FIG. 4D　( APPLY TO SHOPPING LIST )　[ MKT # → ]

FIG. 4I

MARKET GOAL (BY DEMO):

| DEMO | GRP | MAX CPP | TOTAL BUDGET PER DEMO |
|---|---|---|---|
| W2554 | 100 | 50 | 5000 |
| M2554 | 50 | 50 | 2500 |
| | | TOTAL BUDGET: | 7500 |

BUDGET STATUS TO DATE (BY DEMO):

| DEMO | DR GRP | DR PENDING | OTHER GRP | REMAIN GRP | TOTAL SPENT | AVG CPP |
|---|---|---|---|---|---|---|
| W2554 | 20 | 3 | 5 | 72 | 1300 | 52 |
| M2554 | 50 | 0 | 0 | 0 | 2500 | 50 |
| TOTAL | 70 | 3 | 5 | 72 | 3800 | |

UPDATE

GRP PER DAY PART

DEMO →
DEMO SUBSET →
VIEW

| DAY PART | DR GRP TO DATE | OUTSIDE TO DATE | TOTAL TO DATE | TOTAL REMAIN. |
|---|---|---|---|---|
| EARLY MORNING | | | | |
| MORNING FRINGE | | | | |
| NOON NEWS (SOAPS) | | | | |
| EARLY FRINGE | | | | |
| EARLY NEWS | | | | |
| PRIME ACCESS | | | | |
| PRIME TIME | | | | |
| LATE NEWS | | | | |
| LATE FRINGE | | | | |

UPDATE

*FIG. 4J*

MARKET
STATION NAME

GO TO FIG. 4M    SEARCH STATION INVENTORY & APPLY TO MAKE-GOOD BID

—CLICK CONTRACT NUMBER TO VIEW CONTRACT AND MAKE-GOOD DETAILS

| CONTRACT # | FLIGHT DATES | MARKET | STATION | PTS. | CREDIT | SHARE |
|---|---|---|---|---|---|---|
| 44759-9 | 4/5/98-5/12/98 | 211 | WZXC |  | X | X |
| 55456-5 | 4/5/98-5/12/98 | 056 | WSDF |  | X |  |
| 66458-9 | 4/5/98-5/12/98 | 198 | WKJH |  | X |  |
| 91963-4 | 4/5/98-5/12/98 | 211 | KYW | X |  |  |
| 11758-4 | 4/5/98-5/12/98 | 201 | WTCV | X | X |  |

AGENCY NAME
USER NAME

—CLICK ON CONTRACT # TO VIEW AND EDIT DETAILS    WILL LOOK LIKE FIG.4R
—CLICK ON COLUMN HEADER TO RE-ORDER LIST

MAKE-GOODS BIDS AWAITING BUYER ATTENTION

| CONTRACT # | BID DATE | AGENCY | ADVERTISER | PRODUCT | PTS. | CREDIT | SHARE |
|---|---|---|---|---|---|---|---|
| 44759-9 | 4/5/98 | GREY | NABISCO | OREO | | X | X |
| 55456-5 | 7/5/98 | GREY | PEPSI | PEPSI | | X | |
| 66458-9 | 6/8/98 | SAATCHI & SAATCHI | COCA-COLA | MINUTE MAID | | X | |
| 91963-4 | 4/8/98 | SAATCHI & SAATCHI | COCA-COLA | COCA-COLA | X | | |
| 11758-4 | 3/25/98 | SAATCHI & SAATCHI | COCA-COLA | FRUTOPIA | X | X | |

FIG.4Q

AGENCY NAME
USER NAME

CONTRACT #
CONTRACT DATE
MARKET, STATION
ADVERTISER, PRODUCT ( SEARCH STATION INVENTORY & APPLY TO MAKE-GOOD BID )

MAKE-GOOD DETAILS:

MAKE-GOOD 1:

FLIGHT   DAY/TIME   SHOW   DAY PART   # OF AVAILS   DEMO   GRP CONTRACTED   GRP DELIVERED   GRP OWED   GRP PEND.

MAKE-GOOD 2:

FLIGHT   DAY/TIME   SHOW   DAY PART   # OF AVAILS   # AIRED   ISCI #S NOT AIRED   # OWED (CREDIT)   $ VALUE (ORIGINAL CONTRACT DETAILS)
(ORIGINAL CONTRACT BOILER PLATE LANGUAGE)   GO TO FIG. 4S

| CONTRACT #<br>CONTRACT DATE | | BUYER:<br>AGENCY NAME<br>BUYER NAME<br>ADVERTISER<br>PRODUCT | | | SELLER:<br>STATION NAME<br>MARKET<br>SELLER NAME | | | ONLY IF CONTRACT IS COMPLETED<br>OPEN CONTRACT TO RE-WORK<br>OPEN SUPPORTING BID | | |
|---|---|---|---|---|---|---|---|---|---|---|
| FLIGHT DATES | DAY/TIME | PROGRAM | # OF SPOTS | EFFECTIVE DATES | LENGTH | M-G TYPE | DEMO/RTG | RATE | CLASS |
| AVAIL SET 1: | VIEW FREQ. DETAILS | GO TO FIG.4T | | | | | | | |
| 6/3/98-6/26/98 | MF | AM NEWS | 2 | 6/3-6/5 | 30 | QTR. | W2554/1 | 300 | PRE |
| 6/3/98-6/26/98 | MF | AM NEWS | 2 | 6/24-6/25 | 30 | QTR. | W2554/1 | 300 | PRE |
| AVAIL SET 2: | VIEW FREQ. DETAILS | | | | | | | | |
| 6/3/98-6/26/98 | MF | SPIN CITY | 1 | 6/3 | 30 | QTR. | W2554/5.5 | 4000 | PRE |
| AVAIL SET 3: | VIEW FREQ. DETAILS | | | | | | | | |
| 6/3/98-6/26/98 | MF | DARMA AND GREG | 4 | 6/24 | 30 | QTR. | W2554/7 | 4500 | PRE |
| TOTAL: | | | 9 | | | | | 9100 | |
| | | | | | | | BUYER AGREE | SEND TO SELLER | |

FIG.4S

CONTRACT #
CONTRACT DATE

FREQUENCY DETAILS

GO TO FIG. 4S  BACK TO FIRST PAGE OF CONTRACT

AVAIL SET 1:

| FLIGHT DATES | DAY/TIME | PROGRAM | # OF SPOTS | EFFECTIVE DATES | LENGTH | M-G TYPE | DEMO/RTG | RATE | CLASS |
|---|---|---|---|---|---|---|---|---|---|
| 6/3/98-6/26/98 | MF | AM NEWS | 2 | 6/3-6/5 | 30 | QTR. | W2554/1 | 300 | PRE |
| 6/3/98-6/26/98 | MF | AM NEWS | 2 | 6/24-6/25 | 30 | QTR. | W2554/1 | 300 | PRE |

| # OF SET | FROM (DATE) | TO (DATE) | POD | POS. |
|---|---|---|---|---|
| 1 | 6/3 | 6/3 | 1 | ANY |
| 1 | 6/5 | 6/5 | 1 | ANY |
| 2 | 6/24 | 6/25 | ANY | ANY |

BUYER COMMENTS AND INSTRUCTIONS:

FIG. 4T

STATION NAME
USER NAME

GO TO FIG. 5D [EDIT SCHEDULE ON RATE CARD]
GO TO FIG. 5L [CREATE SPECIAL INVENTORY (BUNDLES)]

—CLICK ON AVAIL NUMBER TO VIEW AND EDIT AVAIL SET DETAILS
—CLICK ON COLUMN HEADER TO RE-ORDER LIST

INVENTORY FOR ##/##/#### TO ##/##/####

| DAY | TIME | PROGRAM | IMM PRE RATE | WEEK OF ##/## | WEEK OF ##/## (GO TO FIG. 5F) | WEEK OF ##/## | WEEK OF ##/## | TOTAL AVAILS |
|---|---|---|---|---|---|---|---|---|
| MF | 5-6 P | NEWS | $100 | 18 | 12 | 65 | 288 |
| MF | 6-630P | COSBY | $200 | 24 | 23 | 55 | 434 |
| MF | 630-7P | SIMPSONS | $300 | 12 | 66 | 65 | 258 |
| M | 7P | SEINFIELD 1 | $400 | 5 | 8 | 6 | 565 |
| M | 730P | SEINFIELD 2 | $400 | 2 | 5 | 9 | 288 |

FIG. 5E

STATION NAME
USER NAME

WEEK OF ## / ## / ##
DAY
TIME
PROGRAM

PRICES: $75 NON-PRE
$50 PRE W/
$25 IMM.PRE

TOTAL AVAILS TO START: [25]

TOTAL SOLD THROUGH DR: 5

TOTAL SOLD EXTERNALLY: [2]

TOTAL SOLD: 7

TOTAL PENDING IN DR: 3

TOTAL AVAILS REMAINING: 18

(UPDATE)

GO TO FIG. 5D  (EDIT SCHEDULE AND RATES ON RATE CARD)

○ SHOW STATUS TO BUYER  (TIGHT) →

○ SHOW # OF AVAILS TO BUYER

RELEASE  [X] [#]  IMMEDIATELY
         [X] [#]  (DATE)
         [X] [#]  (DATE)

TOTAL RELEASED IN DR: 10

[X] SHOW RATE TO BUYERS

[X] OVERRIDE DEFAULT RATE:

LATE AVAIL PRICE RELEASE DATE: [      ]

(PRE-SET # OF DAYS BEFORE) →

(UPDATE)

FIG. 5F

STATION NAME
USER NAME

—CLICK ON COLUMN HEADER TO RE-ORDER LIST

| AGENCY | BUYER | ADVERTISER | PRODUCT | FLIGHT DATES | # OF AVAILS | TOTAL OFFER | BID STATUS | VIEW |
|---|---|---|---|---|---|---|---|---|
| GREY | T. SMITH | NABISCO | OREO | ##/##/## - ##/##/## | 50 | $25000 | TO SELLER | ☒ |
| GREY | T. SMITH | PEPSI | PEPSI | ##/##/## - ##/##/## | 10 | $7000 | AT BUYER | ☐ |
| SAATCHI & SAATCHI | J. DOE | COCA-COLA | MINUTE MAID | ##/##/## - ##/##/## | 20 | $35000 | CONTRACT | ☐ |
| SAATCHI & SAATCHI | J. DOE | COCA-COLA | COCA-COLA | ##/##/## - ##/##/## | 25 | $50000 | HOLD | ☐ |
| SAATCHI & SAATCHI | J.DOE | COCA-COLA | FRUTOPIA | ##/##/## - ##/##/## | 7 | $12000 | HOLD | ☐ |

GO TO FIG. 5H (VIEW)

*FIG. 5G*

STATION NAME
USER NAME

— VIEW CONTRACTS

FROM [ ] TO [ ]

[ ] VIEW ONLY CONTRACTS REQUIRING MAKE-GOODS    (VIEW) GO TO FIG. 5J

— VIEW MAKE-GOOD BIDS AWAITING SELLER ATTENTION   (VIEW) SIMILAR TO FIG. 5G

— MAKE GOOD BIDS AWAITING BUYER ATTENTION
  (READ ONLY)   (VIEW) SIMILAR TO FIG. 5G

*FIG. 5I*

STATION NAME
USER NAME
— CLICK ON CONTRACT # TO VIEW AND EDIT DETAILS
— CLICK ON COLUMN HEADER TO RE-ORDER LIST

MAKE-GOODS ACCUMULATED FROM ##/##/#### TO ##/##/####

| CONTRACT # | DATE | AGENCY | ADVERTISER | PRODUCT | MAKE-GOOD STATUS | | | |
|---|---|---|---|---|---|---|---|---|
| | | | | | PTS. | CREDIT | SHARE | |
| 44759-9 | 4/5/98 | GREY | NABISCO | OREO | | X | X | |
| 55456-5 | 7/5/98 | GREY | PEPSI | PEPSI | | X | | |
| 66458-9 | 6/8/98 | SAATCHI & SAATCHI | COCA-COLA | MINUTE MAID | | X | | |
| 91963-4 | 4/8/98 | SAATCHI & SAATCHI | COCA-COLA | COCA-COLA | X | | | |
| 11758-4 | 3/25/98 | SAATCHI & SAATCHI | COCA-COLA | FRUTOPIA | X | X | | |

| STATION NAME | SEARCH STATION INVENTORY & OFFER MAKE-GOOD |
| USER NAME | GO TO FIG. 5M |

CONTRACT #
CONTRACT DATE
AGENCY
ADVERTISER
PRODUCT

---

MAKE-GOOD DETAILS:

MAKE-GOOD 1:

| FLIGHT | DAY/TIME | SHOW | DAY PART | # OF AVAILS | DEMO | GRP CONTRACTED | GRP DELIVERED | GRP OWED | GRP PEND. |

MAKE-GOOD 2:

| FLIGHT | DAY/TIME | SHOW | DAY PART | # OF AVAILS | # AIRED | ISCI #S NOT AIRED | # OWED (CREDIT) | $ VALUE |

→ (ORIGINAL CONTRACT DETAILS)   GO TO FIG.5P
(ORIGINAL CONTRACT BOILER PLATE LANGUAGE)

STATION NAME
USER NAME

☐ YEAR → FROM MONTH → WEEK OF → TO MONTH → WEEK OF →
☐ DAY PART 1 →
☐ SHOW CATEGORY →
SHOW NAME: _____  SHOW NAME STANDARDS
☐ SELECT CALC →  CALC RESULT

GO TO FIG.5N  SEARCH STATION INVENTORY

*FIG.5M*

STATION NAME
USER NAME

SEARCH PAREMETERS:
DAY PART, SHOW CATEGORY, SHOW NAME, DEMO, COST

RE-ORDER SEARCH RESULTS BY:

( DP ) ( SH. CAT ) ( SHOW ) ( DEMO ) ( COST ) ( # OF )

SEARCH RESULTS (FOR THE WEEK OF # # / # # / # # THROUGH THE WEEK OF # # / # # / # # ):

DAY PART, SHOW CATEGORY, SHOW NAME, DEMO, COST, # OF AVAILS  ☐ CHECK BOX

DAY PART, SHOW CATEGORY, SHOW NAME, DEMO, COST, # OF AVAILS  ☐

DAY PART, SHOW CATEGORY, SHOW NAME, DEMO, COST, # OF AVAILS  ☐

( SEARCH AGAIN )

GO TO FIG. 5M

APPLY CHOICES TO ANEW
MAKE-GOOD BID:
NAME MAKE-GOOD BID: [ ENTER NAME ] ( APPLY )

GO TO FIG. 5O

APPLY CHOICES TO AN
EXISTING MAKE-GOOD BID:
( CURRENT MAKE-GOOD BIDS ▸ )
( APPLY )

CONTRACT #
CONTRACT DATE

BUYER:
AGENCY NAME
BUYER NAME
ADVERTISER
PRODUCT

SELLER:
STATION NAME
MARKET
SELLER NAME

ONLY IF CONTRACT IS COMPLETED ( OPEN CONTRACT TO RE-WORK )
( OPEN SUPPORTING BID )

| FLIGHT DATES | DAY/TIME | PROGRAM | # OF SPOTS | EFFECTIVE DATES | LENGTH | M-G TYPE | DEMO/RTG | RATE | CLASS |
|---|---|---|---|---|---|---|---|---|---|
| AVAIL SET 1: | ( VIEW FREQ DETAILS ) | GO TO FIG.5Q | | | | | | | |
| 6/3/98-6/26/98 | MF | AM NEWS | 2 | 6/3-6/5 | 30 | QTR. | W2554/1 | 300 | PRE |
| 6/3/98-6/26/98 | MF | AM NEWS | 2 | 6/24-6/25 | 30 | QTR. | W2554/1 | 300 | PRE |
| AVAIL SET 2: | ( VIEW FREQ DETAILS ) | | | | | | | | |
| 6/3/98-6/26/98 | MF | SPIN CITY | 2 | 6/3 | 30 | QTR. | W2554/5.5 | 4000 | PRE |
| AVAIL SET 3: | ( VIEW FREQ DETAILS ) | | | | | | | | |
| 6/3/98-6/26/98 | MF | DARMA AND GREG | 2 | 6/24 | 30 | QTR. | W2554/7 | 4500 | PRE |
| TOTAL: | | | 9 | | | | | 9100 | |

( BUYER AGREE )   ( SEND TO SELLER )

*FIG.5P*

CONTRACT #
CONTRACT DATE                                                    GO TO FIG. 5P   BACK TO FIRST PAGE OF CONTRACT

FREQUENCY DETAILS

AVAIL SET 1:

| FLIGHT DATES | DAY/TIME | PROGRAM | # OF SPOTS | EFFECTIVE DATES | LENGTH | M-G TYPE | DEMO/RTG | RATE | CLASS |
|---|---|---|---|---|---|---|---|---|---|
| 6/3/98-6/26/98 | MF | AM NEWS | 2 | 6/3-6/5 | 30 | QTR. | W2554/1 | 300 | PRE |
| 6/3/98-6/26/98 | MF | AM NEWS | 2 | 6/24-6/25 | 30 | QTR. | W2554/1 | 300 | PRE |

| # OF SET | FROM (DATE) | TO (DATE) | POD | POS. |
|---|---|---|---|---|
| 1 | 6/3 | 6/3 | 1 | ANY |
| 1 | 6/5 | 6/5 | 1 | ANY |
| 2 | 6/24 | 6/25 | ANY | ANY |

BUYER COMMENTS AND INSTRUCTIONS:

*FIG. 5Q*

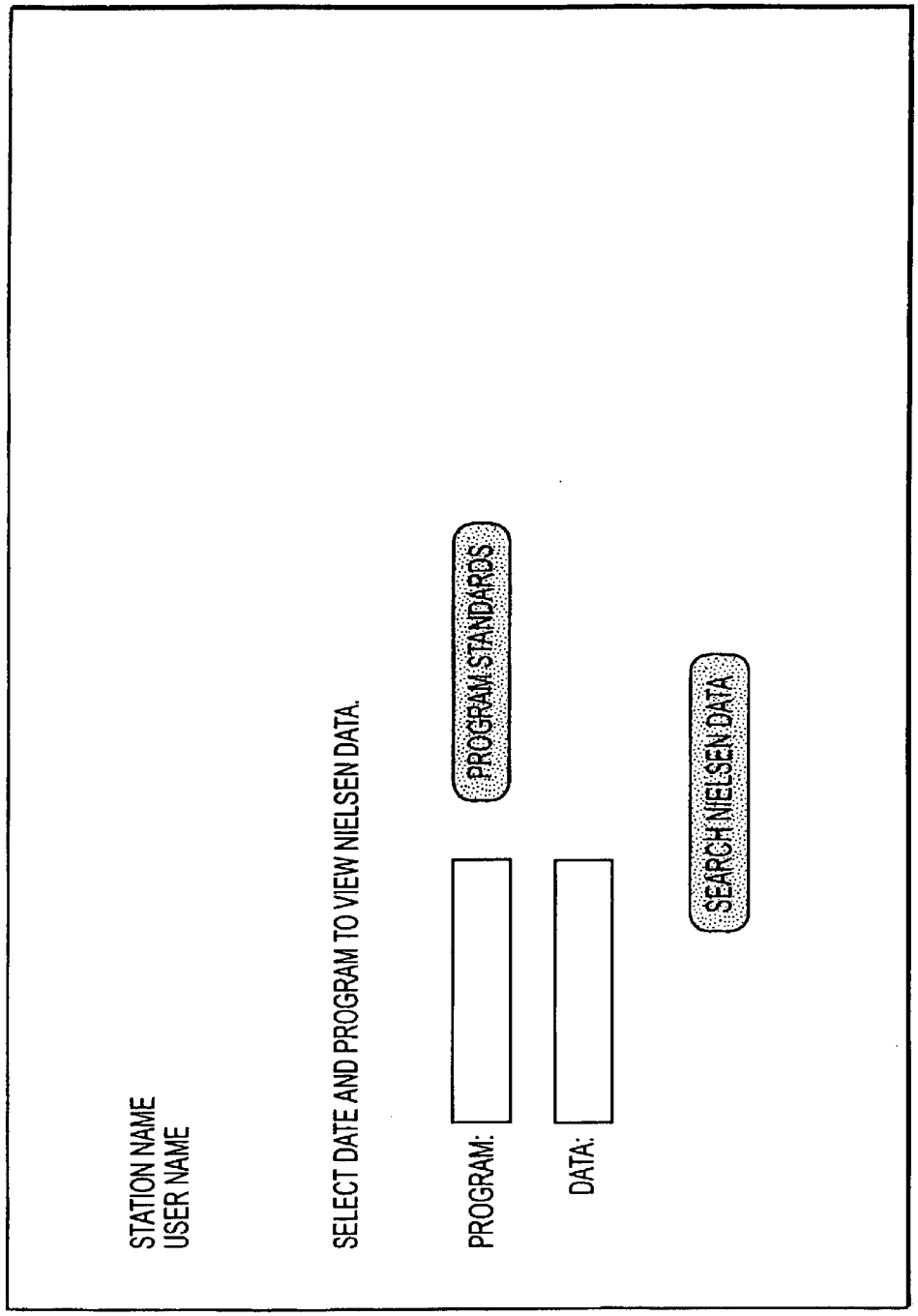

METHOD AND SYSTEM FOR SELLING AND PURCHASING MEDIA ADVERTISING OVER A DISTRIBUTED COMMUNICATION NETWORK

BACKGROUND OF THE INVENTION

1. Field of the Invention

The present invention relates generally to methods and systems for conducting commercial transactions over a distributed communication network, such as the Internet, and more specifically, the World Wide Web. More particularly, the present invention relates to a method and system wherein media companies and media advertising purchasers are able to sell and buy media advertising time or media advertising space, or a combination of advertising time and space, on a local, nationwide, or worldwide basis from a single site on a distributed communication network.

2. Background and State of the Art

The impact of developments in information technology and digital technology on the broadcasting and mass media communication industry is in its infancy. The advent and rapid development of the Internet and advanced digital television technologies herald an exponential increase in the number of communication, entertainment and information resources over those existing today.

This increase in media content will bring with it a concomitant expansion in advertising "shelf-space." The broadcast television audience, already splintered, will continue to fragment to other information/entertainment sources. Advertisers will need to become more astute in making media buying decisions to achieve their goal: that is, to reach their target audience in the most efficient manner possible.

The present system for the media (e.g., television and radio) advertising market is dominated by media agencies that sell advertising time for the media companies, and by the internal sales forces of the media companies themselves. Each month, more options become available for media advertising placement, which buyers of advertising time do not presently have sufficient tools to evaluate. The entrenched agency/client relationship has caused media advertising, especially television advertising, to be over-priced in terms of its cost per thousand viewers (CPM). Advertising agencies buy particular media time for their clients based on their level of comfort with the research model that supports the medium, and not because it represents the most efficient way for the advertiser to reach its demographically targeted audience. This model is further reinforced by the bundling of media availabilities by media representatives for sale to buyers in packages, rather than selling the availabilities individually.

With the state of the advertising audience being as fragmented as it is, only to grow more so in the future, it is no longer sufficient for advertisers to reach just large numbers of viewers. Rather, there is a need for media advertising purchases to be closely targeted to a marketer's demographic. What is needed is a model that takes into account the broadcast networks' loss of share, the fast growth of new media platforms to reach audiences, and the blossoming digital environment which will create even more content viewing choices. Presently, no such model exists. Recent consolidations in the media representation industry has actually left media sellers with less options to sell their inventory of advertising time.

Another problem in the art pertains to advertising time that has been paid for by the buyer, but during which the buyer's advertisement or commercial did not air. This can be caused by a number of different factors, such as preemption by live events or special bulletins, power outages, errors and the like. For any such advertisement or commercial, the seller must "make good" on the contract by running or airing the buyer's advertisement at a later time, without further cost to the buyer. The seller must keep track of these "makegoods" in the buyer's account by crediting the buyer each time a paid commercial has failed to run for whatever reason. More importantly, the buyer wishes to be able to verify that advertising time paid for was actually used to run the buyer's advertisement or commercial during the time and/or day specified in the contract. Conventionally, this has proved to be a daunting and costly task, especially in cases where the buyer may have multiple commercials or advertisements running. in different geographical markets, at different times, over different days, and perhaps multiple times per day. There exists a need in the art to simply and reduce the burden and expense to the buyer to verify that he has gotten what he has already paid for.

SUMMARY OF THE INVENTION

The present invention provides a solution to the problems and shortcomings in the art as described above, by providing a method and system for bringing media sellers and media buyers together at a central location over a distributed communication network, such as a server or whereby media advertising sellers are able to list their available advertising inventory (known as "avails" in the industry), media advertising buyers are able to input desired parameters of an advertising purchase, such as total budget, percentage of the budget to be spent by media type, desired demographics, cost per viewer (CPP), cost per thousand viewers (CPM), geographic region, and time period, and automatically retrieve matching avail results. Buyers are able to view demographic information for the available media (as compiled by demographic research entities), schedule purchases according to the budget, media split and desired demographics, and vary parameters within the search results to obtain a number of different scenarios. Buyers also are able to view previous bookings by quarter (or other time period) for particular avails, and previous offers for similar avails.

The present invention further provides a method and system wherein the central server enables buyers to make offers to media sellers on particular avails or groups of avails on-line, allows media sellers to receive all offers on-line and accept specific offers, modify specific offers, and enables the buyers to execute media purchase contracts and submit payment on-line. The system may interface directly with the accounting/ledger systems of sellers and buyers, whereby payment may be passed through the server directly to the seller from the buyer, and automatically update the parties' financial and accounting records.

The present invention further provides automatic verification for buyers that their ad or commercial actually ran according to the contract. The invention further provides a makegood bank wherein account of credits owed to a media buyer are automatically kept.

According to another aspect of the invention, buyers are able to upload to the server the actual commercial or advertisement in digital form, such as MPEG, AVI, JPEG, TIF, GIF, BMP, Targa, etc. The seller then downloads the content in conjunction with the executed contract, and runs or plays the content during the specified time(s).

More particularly, the present invention provides a method for buying and selling media advertising units over a distributed communication network, including the steps of providing a server on the network, the server including a database containing information pertaining to available advertising units in conjunction with specific media content provided by media content providers, providing buyers of the advertising units access to the database over the network, whereby the buyers may enter desired search parameters into a search engine and receive search results indicating particular advertising units meeting the search criteria, the server further receiving bids on advertising units selected by buyers from the search, and communicating the bids to sellers of the advertising units, and providing sellers of the advertising units access to the database over the network, whereby the sellers may enter the information, receive bids entered by the buyers, accept the bids, modify the bids, and enter contracts into the server for communication to the buyers. According to another aspect of the invention, a system is provided to carry the above described method.

BRIEF DESCRIPTION OF THE DRAWINGS

The present invention will become more fully understood from the following detailed description of the preferred embodiments in conjunction with the accompanying drawings, in which.

DETAILED DESCRIPTION OF THE PREFERRED EMBODIMENTS

Figure 1:
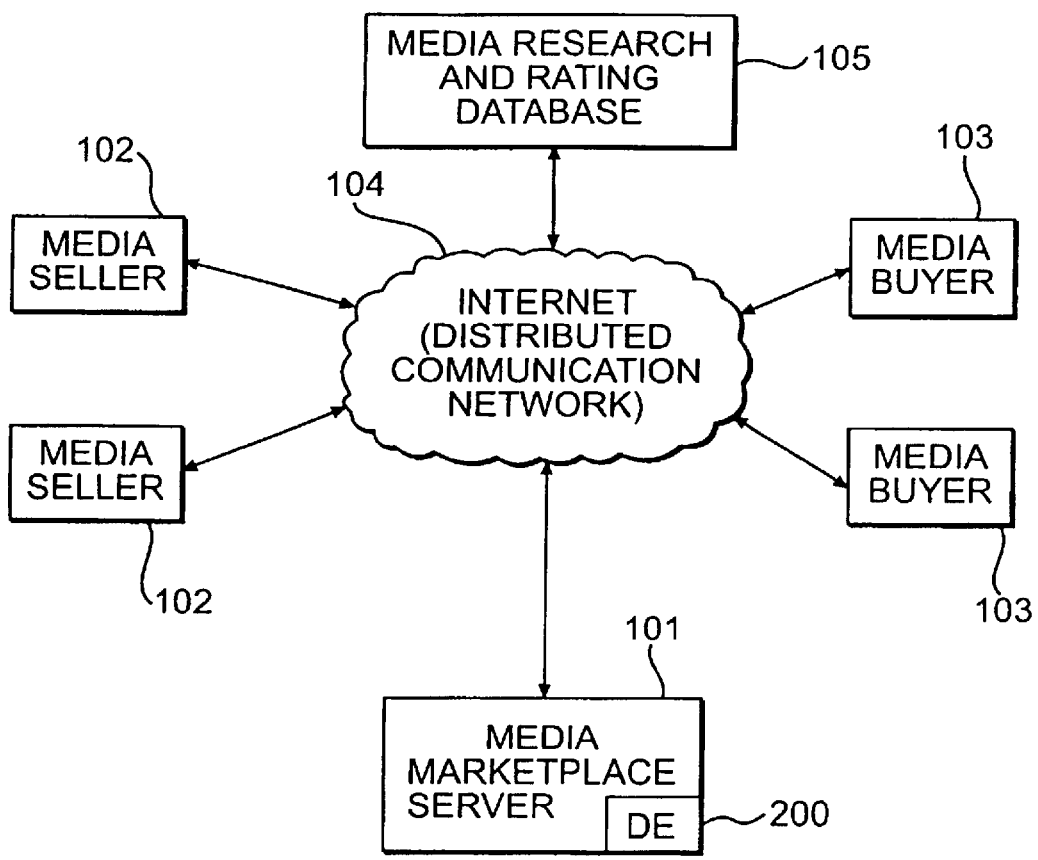
FIG. 1 is a block diagram of a system for selling and purchasing media advertising over a distributed communication network, according to one preferred embodiment of the invention.

FIG. 1 is a block diagram of a system for selling and purchasing media advertising over a distributed communication network. A media marketplace server 101 is connected to multiple media seller clients 102 and media buyer clients 103 over distributed communication network 104. In the preferred embodiment of the invention, the network is the Internet, and more specifically the World Wide Web. However, for purposes of the invention, the network may be any distributed network that enables communication between servers and client stations.

The media marketplace server is also connected to a media research/rating database 105. The research database 105 represents media demographics and/or ratings information obtained by such firms as Nielsen (television), Arbitron (radio), IPro and NetGravity (World Wide Web), for content such as television and radio programming, Internet content, etc. For purposes of disclosure, the present invention will be described in the context of television advertising. However, the applicability of the present invention is not limited to television and in fact contemplates radio and Internet content providers, as well as publications such as magazines, newspapers, and periodicals, and can be extended to other spatial media providers such as billboard owners, transit companies, retailers, universities, or any other entity having the capacity to present advertising targeted to a specific demographic. For example, in the case of print media, advertising availabilities would be classified in terms of type of publication, section of newspaper, day of week of publication (newspaper), location within publication (magazine), month of publication, etc. For spatial advertisers, availabilities would be classified by such parameters as demographics, location, and exposure (number of viewers per period of time). Hereinafter, advertising time or advertising space will be referred to generically as an advertising unit.

The server 101 can be any type of known computer server system, such as products manufactured by Sun Microsystems, Hewlett-Packard, IBM or other manufacturers. The server 101 includes a database 200, containing data including the data shown in FIG. 2. Database 200 is preferably a Relational Database Management system (RDBM), such as marketed by Oracle, Sybase or other provider. In the preferred embodiment, the database is implemented as an Oracle RDBMS on a Sun Microsystems UNIX platform. However, other equivalent platforms may be used without departing from the scope of the invention.

Figure 2:
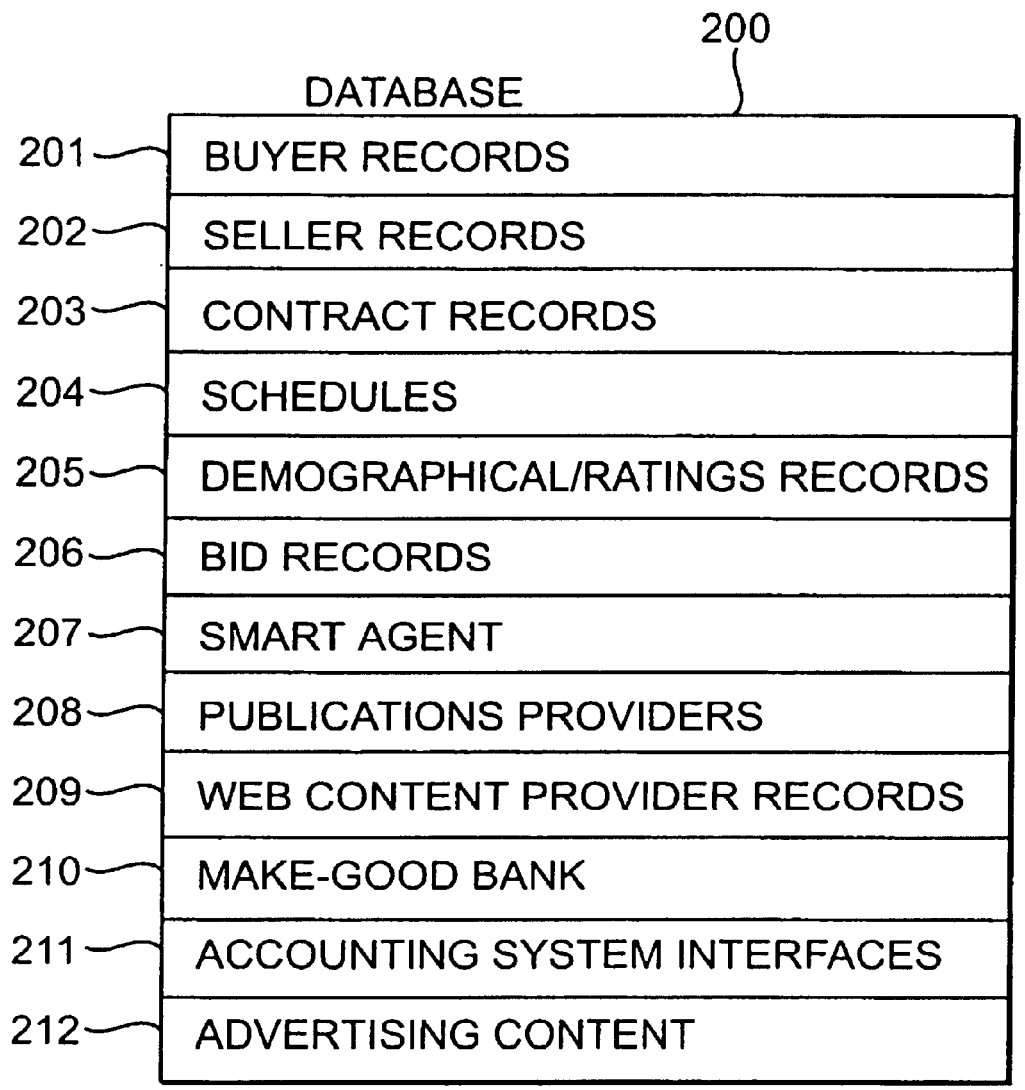
FIG. 2 is a block diagram of a database contained the media marketplace server of FIG. 1, according to one preferred embodiment.

As shown in FIG. 2, database 200 contains data records 201 pertaining to media buyers, media seller records 202, contract records 203, media (e.g., programming) schedule records 204, demographical/ratings records 205, buyer bid records 206, a smart agent search engine 207, publisher records 208, World Wide Web content provider records 209, a make-good bank 210, accounting system interface records 211, and advertising content (such as commercials and advertisements uploaded by buyers) 212.

Figure 3:
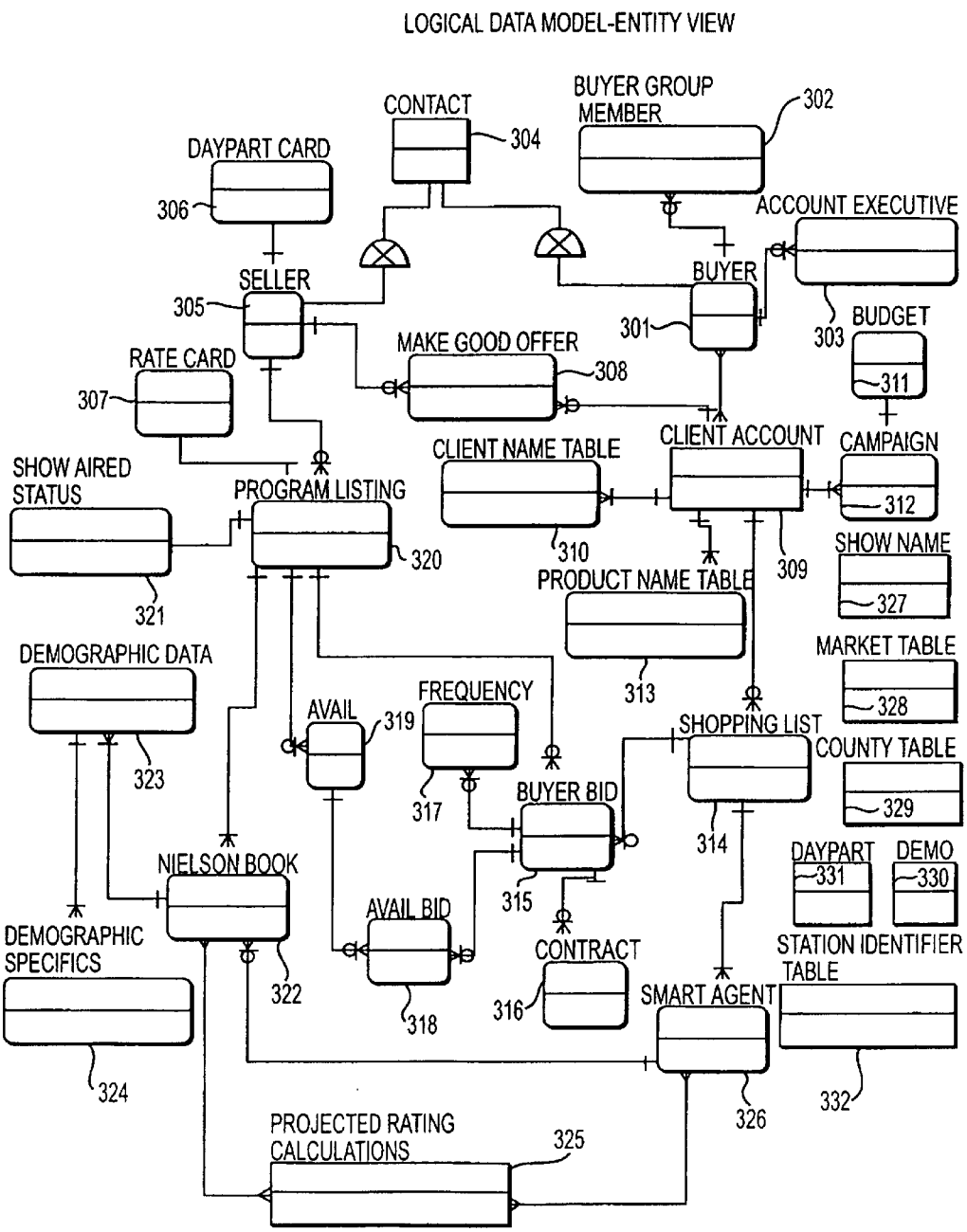
FIG. 3 is a logical data model diagram of a method and system according to one embodiment of the present invention.

The fundamental logical data model of the system is presented in FIG. 3. These logical items consist of business entities, attributes, and relationships between entities and attributes. The entities, attributes and relationships are used to define the database and to ensure that paths exist in the database to the information required by the end users (i.e., media sellers and media buyers). The logical data model presented here is for purposes of full disclosure only, and is not intended to limit the possible logical data models that can be used in conjunction with the present invention.

Buyer 301 represents an individual in charge of buying advertising time or advertising space for a particular client, such as General Electric, and may also be responsible for multiple client accounts, such as an individual at an advertising agency. Buyer group number 302 represents individuals who can purchase on behalf of a single buyer for a specific client account or accounts.

Account Executive 303 represents a person in charge of actually attending to client accounts, such as tending to contracts between buyer and seller. Seller 305 represents, for example, a television network or television station with advertising inventory avails, or an agent acting on behalf of one or a number of stations independently. Contact 304 represents a parent record of Buyer 301 and Seller 305, and contains general information for both child entries, such as name, address, and telephone number. Daypart Card 306 represents dayparts defined by the seller for the particular station or network. The daypart card 331 is associated with Daypart entry 331, which contains a reference list of daypart names representing type of programming occurring at different times of day, e.g., early fringe, soap opera, prime time, etc. According to a preferred embodiment of the invention, the entire programming schedule of the station is already entered into the system by the marketplace server provider, for a predetermined time period, which may range anywhere from one quarter to ten or more years.

Rate Card 307 is a seller-developed cost per point for programs and times. The rate card may be divided into available category (such as preemptable, preemptable with notice, non-preemptable, etc.), and is usually developed by quarter (i.e., three month period) but may be changed weekly or more frequently. Make Good Offer 308 represents an offer from either the buyer or seller using make-good demographic points as currency for the purchase or buy.

Client Account 309 is an entry that contains the name of the advertiser for whom the buyer is buying. The Client Name Table 310 is a list that associates client names with client codes for translational purposes within the operating program. Budget 311 contains the amount of money allocated by a client for a buyer to spend on a particular avail purchase or on a campaign. Campaign 312 contains targeted buy request information from a client, such as pertaining to a particular product, time of year (e.g. Christmas season), a product launch, or product visibility throughout the year. Product Name Table 313 is a list that associates product names with product codes for translational purposes. Shopping List 314 contains a grouping of selected "avails," or available advertising time slots, to be bid upon by a particular buyer or account executive for a particular buy.

Program Listing 320 contains a schedule of shows and showtimes for the seller. Avail 319 indicates a piece of time available for a commercial to be shown during a program. Show Aired Status entry 321 indicates whether the commercial aired or not. If not, then credit is due to the buyer and will be reflected in the make-good bank in the client account. The aired status is determined by obtaining data on aired commercials from providers such as Competitive Media Research (CMR), Nielsen Sigma Services, or Wink.

Buyer Bid 315 contains a specification of information such as rating points, demographic, and frequency of the commercial on the show, from a buyer to a seller regarding an avail or group of avails. Avail Bid 319 indicates a relationship between an Avail and a Buyer Bid.

Frequency 317 indicates how often and when (week of) a commercial should be run or aired. Contract 316 contains an agreement between buyer and seller as to the terms and conditions of an avail buy. The contract is derived from the Buyer Bid. Nielsen Book 322 is a quarterly report from the Nielsen rating company that shows overall ratings, demographic group ratings, and specifically named demographic ratings for individual television shows. The entry 322 also may represent overnight information such as Nielsen overnight ratings (local and national), or research provided by Wink. Demographic Data entry 323 contains the categories of demographic data (e.g., household with annual earnings over 50K) used by Nielsen to determine overall ratings. Demographic Specifics entry 324 contains demographic identifiers used by Nielsen to group viewers and establish a rating based on the number of viewers of that group.

Smartagent 326 contains search criteria developed by a buyer to refine the search results of availability searches in a particular regional market, demographic, daypart, etc. Projected Rating Calculations 325 contains calculations used by a buyer to determine a projected bid for a specific buy.

Show Name table 327 is a reference list of names of shows that are aired by broadcast stations (actual or projected). Market Table 328 contains a list of market names. County Table 329 is a reference list of identifiers for counties, such as values A, B, C, and D, each associated with a population density. Demo reference table 330 contains a list of demographic criteria names, as used in Nielsen ratings, to be used by a buyer in formulating a search with the smartagent. Station Identifier Table 332 is a reference list of broadcast station call letters.

The operation of the system and method will now be described, from the point of view of the interactive operations of a buyer and of a seller on the system, using as an example the case of broadcast television station or network sellers, and buyers seeking to purchase advertising time on such broadcast stations or networks.

Figure 4B:
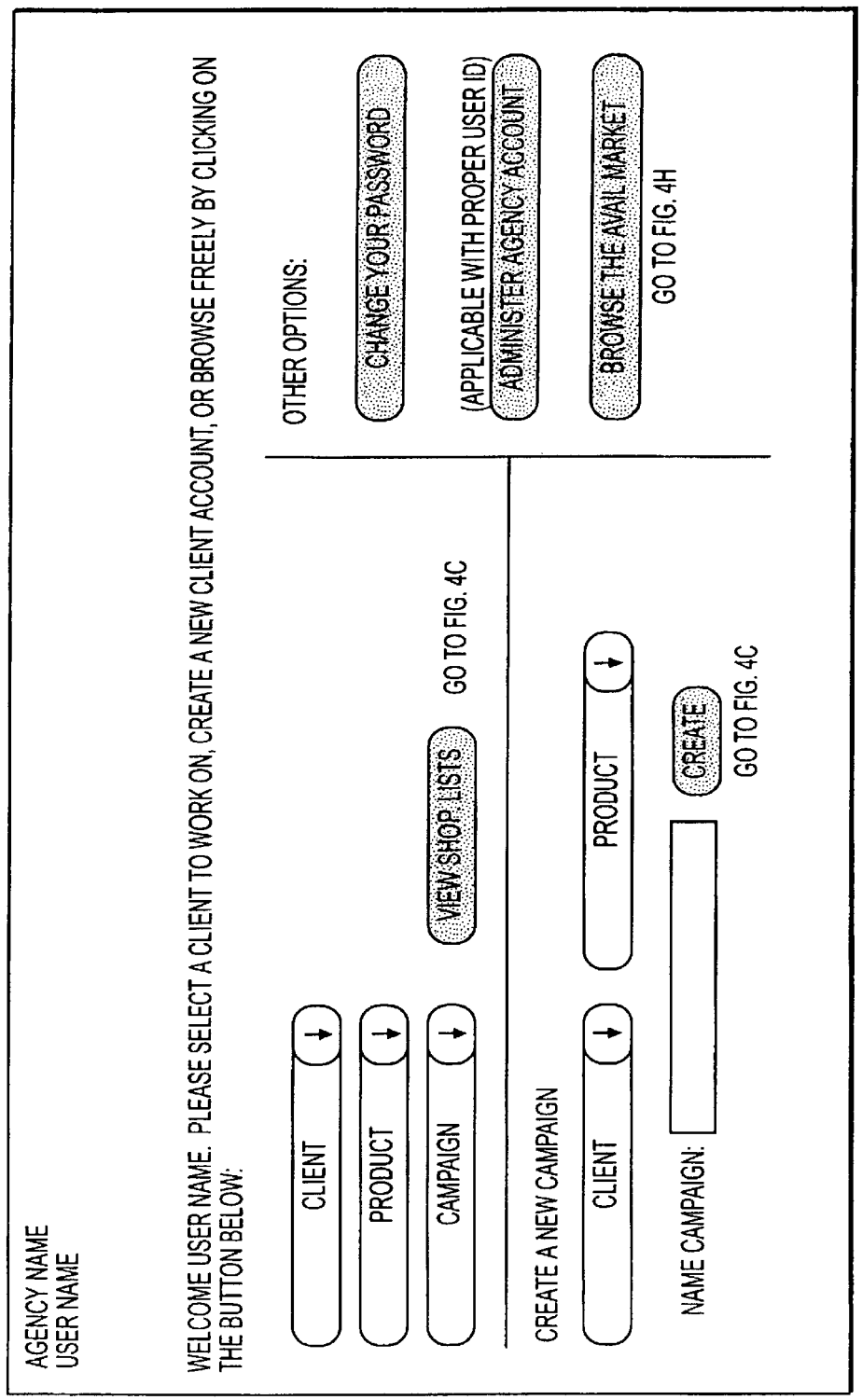
FIGS. 4A–4T are diagrams of buyer process flows in the form of screen displays, according to one embodiment of the invention.

Buyer Actions FIGS. 4A–4T illustrate the interactive operations of a buyer on the system, in the form of screen displays that a buyer sees on her computer display monitor, and interacts with to carry out desired functions. At FIG. 4A, the buyer inputs her user name and password (which have been previously set up with the system in establishing a buyer account) in order to log on to the system. After the buyer has signed on to the system successfully, the buyer is presented with options such as shown in FIG. 4B. Here, as shown, the buyer may select from a stored list of clients a particular client account to work on, create new client accounts, select specific products forming the subject of advertisements or commercials, work on stored campaigns for particular client accounts, or create new campaigns. In addition, the buyer may perform administrative functions such as changing her password or updating the advertising agency's account, or may simply browse the avail database.

Figure 4C:
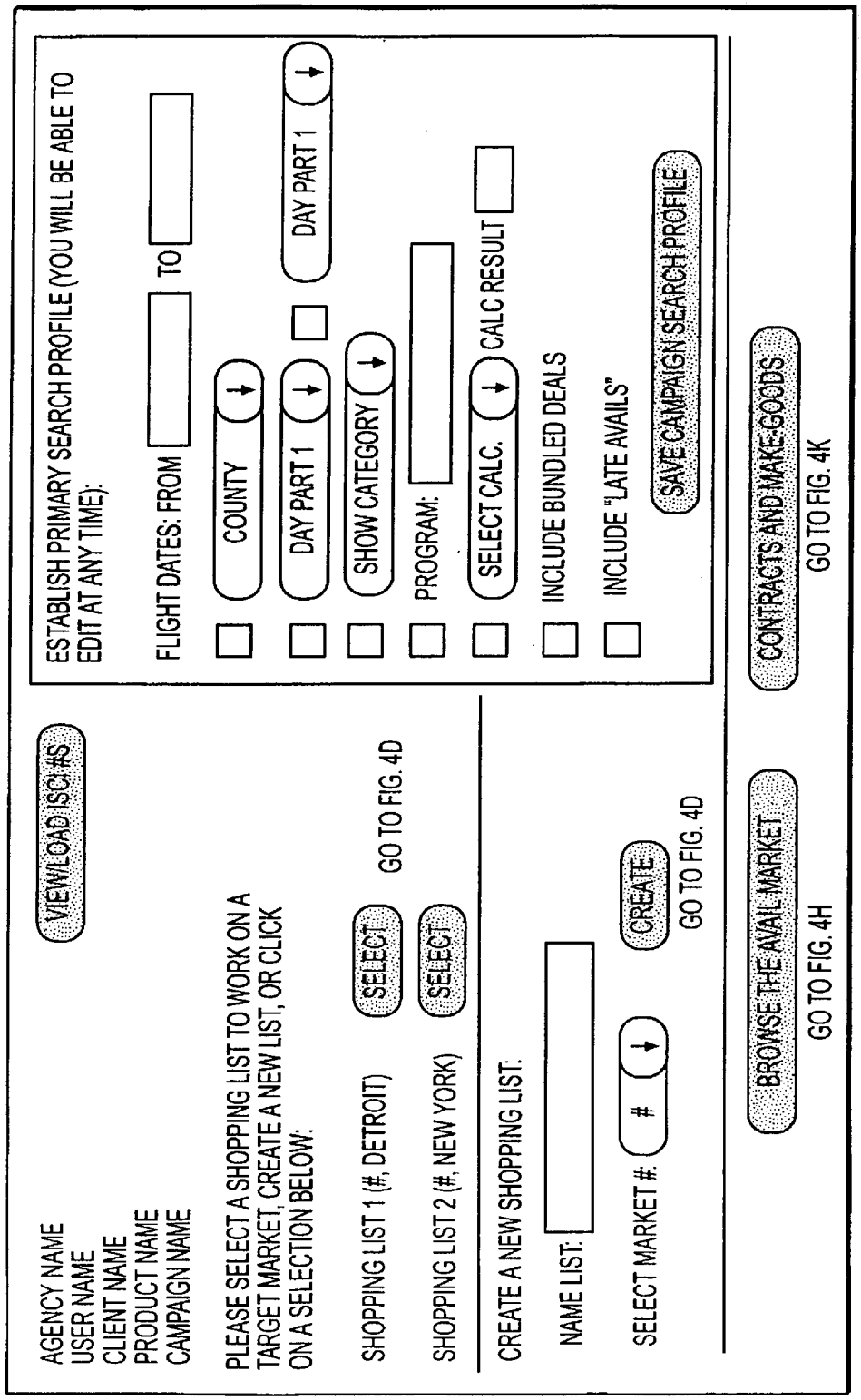

If the buyer chooses to create a new campaign or to view stored shopping lists, she clicks on the appropriate icons and will be presented with a display as shown in FIG. 4C. Here, the buyer may create new shopping lists (wherein a shopping list would contain a grouping of selected avails for particular target markets, such as Detroit, New York, etc.) and specify a search profile to be used by the smartagent in conducting a search of the avail inventory, or may work on stored shopping lists previously created. To establish a primary search profile, the buyer would enter desired "flight" dates (i.e., dates on which the advertisement or commercial would be run or aired), desired markets (divided by county or other appropriate geographical regional market identifier), desired dayparts (e.g., soap operas, prime time, early fringe, etc.), and desired category of show or program. Additionally, the buyer may calculate bargaining parameters (such as rating, CPP, CPM, etc.), and may include bundled deals and late avails in the search parameters. The buyer also may browse the avail market or view contracts and make-goods (as will described below) by selecting the appropriate icons.

Figure 4D:
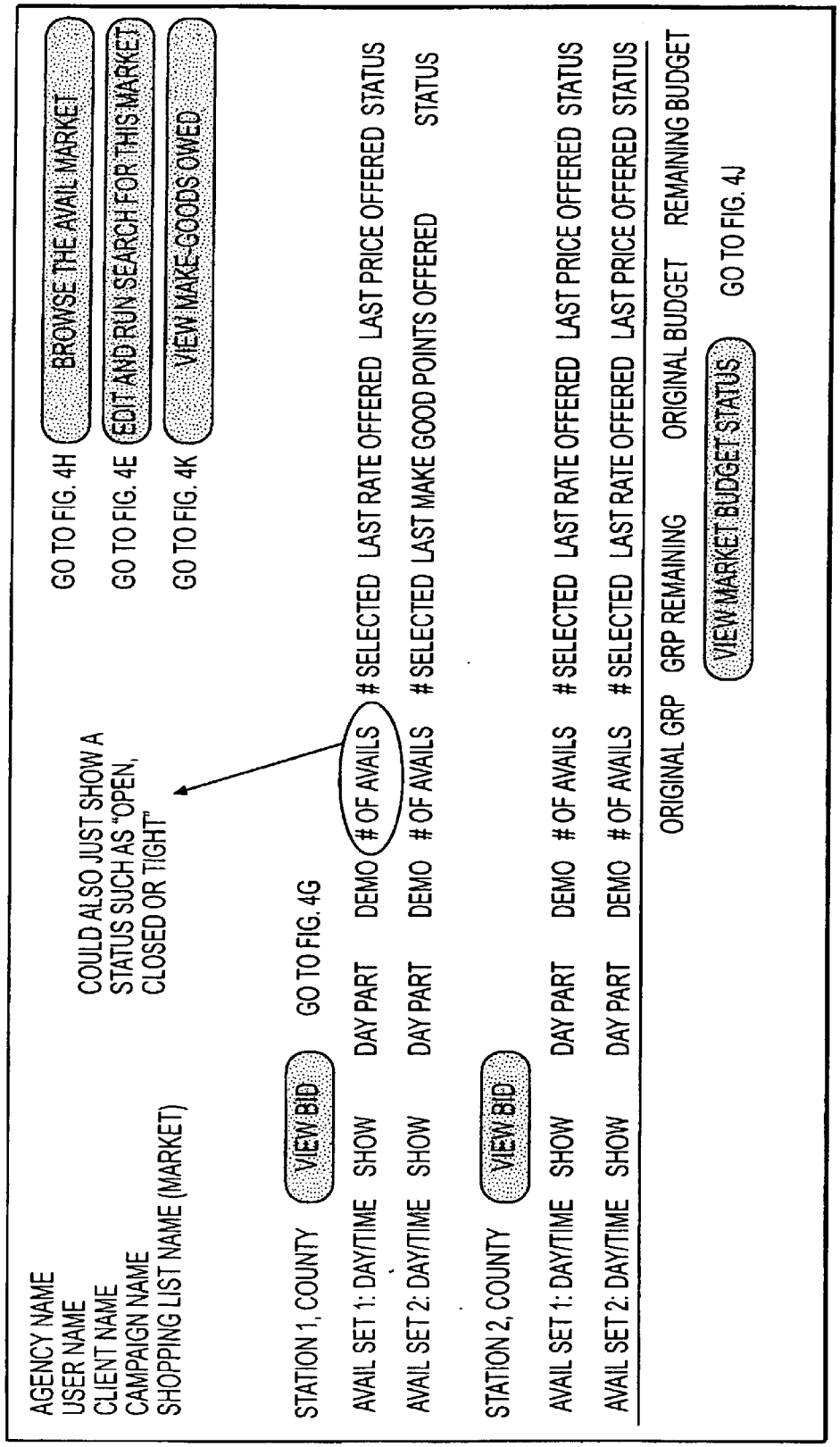

To create a shopping list, after entering the search profile parameters, the buyer enters a name for the list and selects a number for the market, and selects the "create" icon. The buyer is then presented with a display as shown in FIG. 4D. The system will display a list of avail sets by station in the selected market (e.g., county) and will indicate the day and time, show category, daypart, demographic information, number of avails (i.e., the number of available advertising slots for that show) the number of avails already selected by other bidders, the last rate offered by the seller, the last price offered by a buyer, and the status of the avail set. Instead of indicating the number of avails for each show, an avail status indicator could be displayed, such as "open," "tight" or "closed."

The buyer may then edit and run a search for the shopping list market number, as shown in FIG. 4E. If the buyer wishes to edit the search parameters, she clicks on the indicated icons to modify those entries. Once the buyer wishes to run the search, she clicks on the "run search" icon. FIG. 4F shows an example of a screen display of the search results. The search results indicate station, county, daypart, show category, program (or bundle name), calculation results, cost, number of avails, and late avail status, and may be listed in sequence according to any of those parameters. The search may be edited and run again by clicking on the "edit this search now" icon, which will return the buyer to the screen of FIG. 4E. The buyer also may apply the search results to the shopping list by clicking the "apply to shopping list" icon, which returns the buyer to FIG. 4D. At this time, the buyer may wish to work on a specific bid. The buyer clicks on the "view bid" icon, which brings the buyer to FIG. 4G.

Figure 4G:
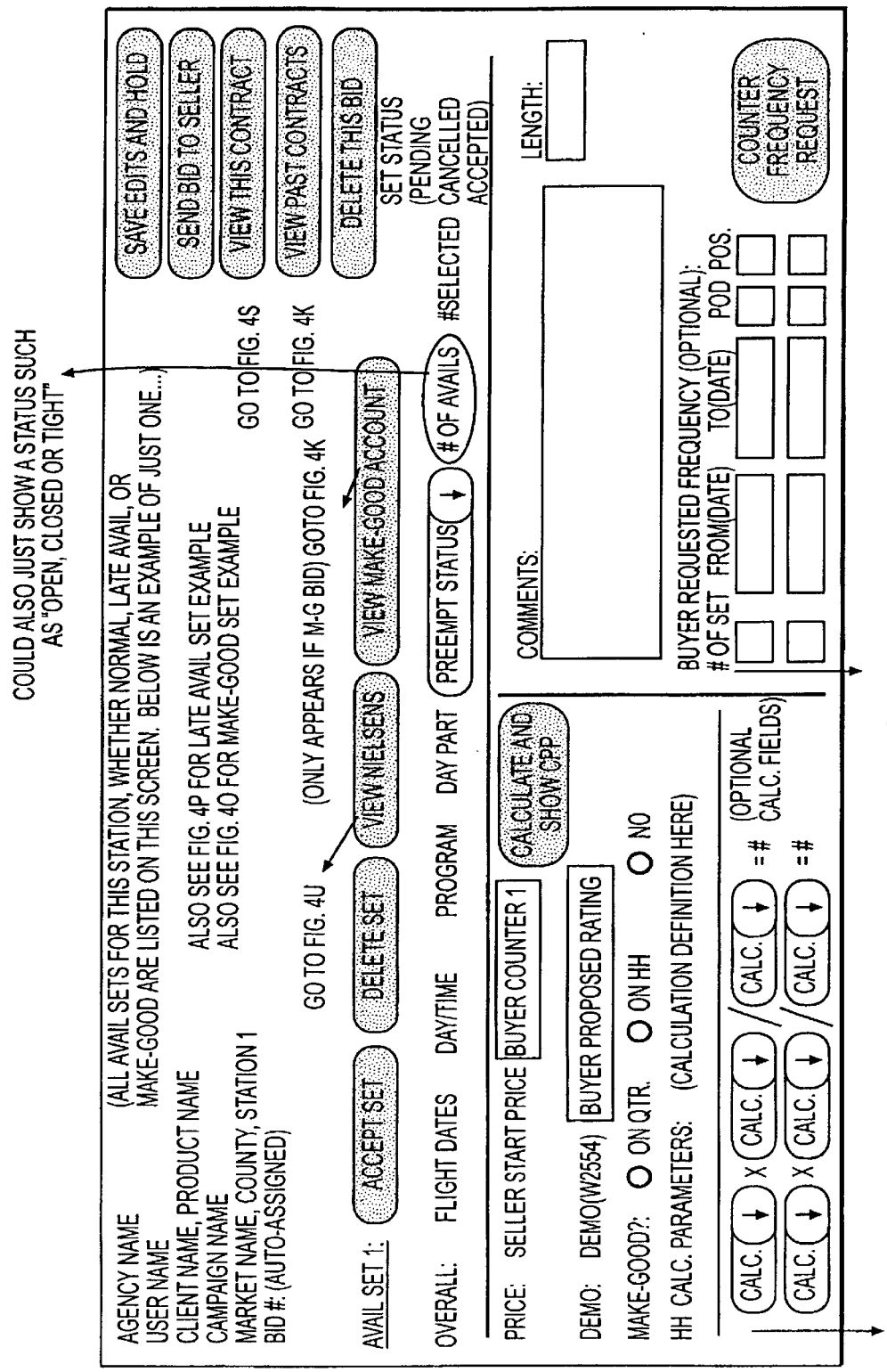

As shown in FIG. 4G, the buyer will see the seller's start price for the avail set by station, and will enter in the buyer counter the buyer's offer for the avail set. The buyer will also see a demographic code and is able to enter the buyer's proposed rating for the avail set. The buyer also may indicate whether the avail set is desired to be credited against a make-good obligation on the part of the seller. After entering the bid offer and proposed rating, the buyer may calculate cost by clicking on the "calculate and show cpp" icon.

The buyer may view the status of the make-good account (FIG. 4K) and the Nielsen ratings for the programs (FIG. 4U) by clicking on the corresponding icons. The buyer further enters any special comments in a field reserved for such comments, and also optionally enters a desired frequency for the commercial to be run. The buyer then has the option of saving the edits and holding the defined search, sending the bid to the seller, viewing the contract for the bid (if it has been accepted by the seller), viewing past contracts with the seller, or deleting the bid.

Figure 4H:
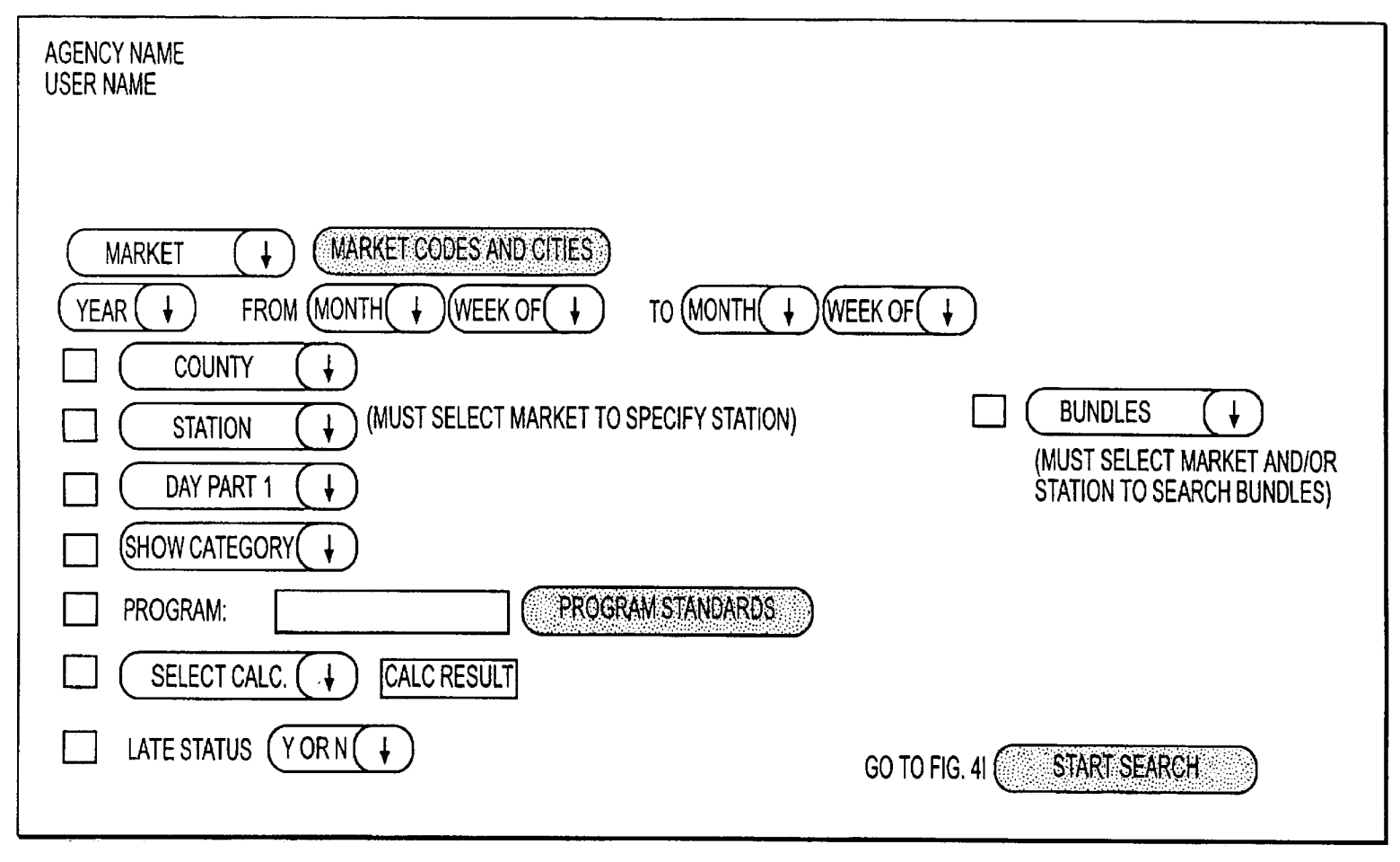

If the buyer wishes simply to browse the avail market (see FIG. 4B), the buyer will be taken to a display such as shown in FIG. 4H. Here, the buyer enters smartagent search parameters similar to those entered in FIG. 4C, and clicks on the "start search" icon. The search results are then displayed to the buyer in a form as shown in FIG. 4I. At this time, the buyer may select a campaign, apply the search to a selected shopping list, or create a new shopping list.

FIG. 4J shows a display for viewing and editing the buyer's market budget status, which the buyer may select as a function from the display of FIG. 4D. The buyer enters desired demographics codes, gross rating point (GRP), and maximum cost per point (CPP), to arrive at a total budget for the demographic. The display further indicates the budget status to date with respect total amounts spent for each desired demographic.

Figure 4K:
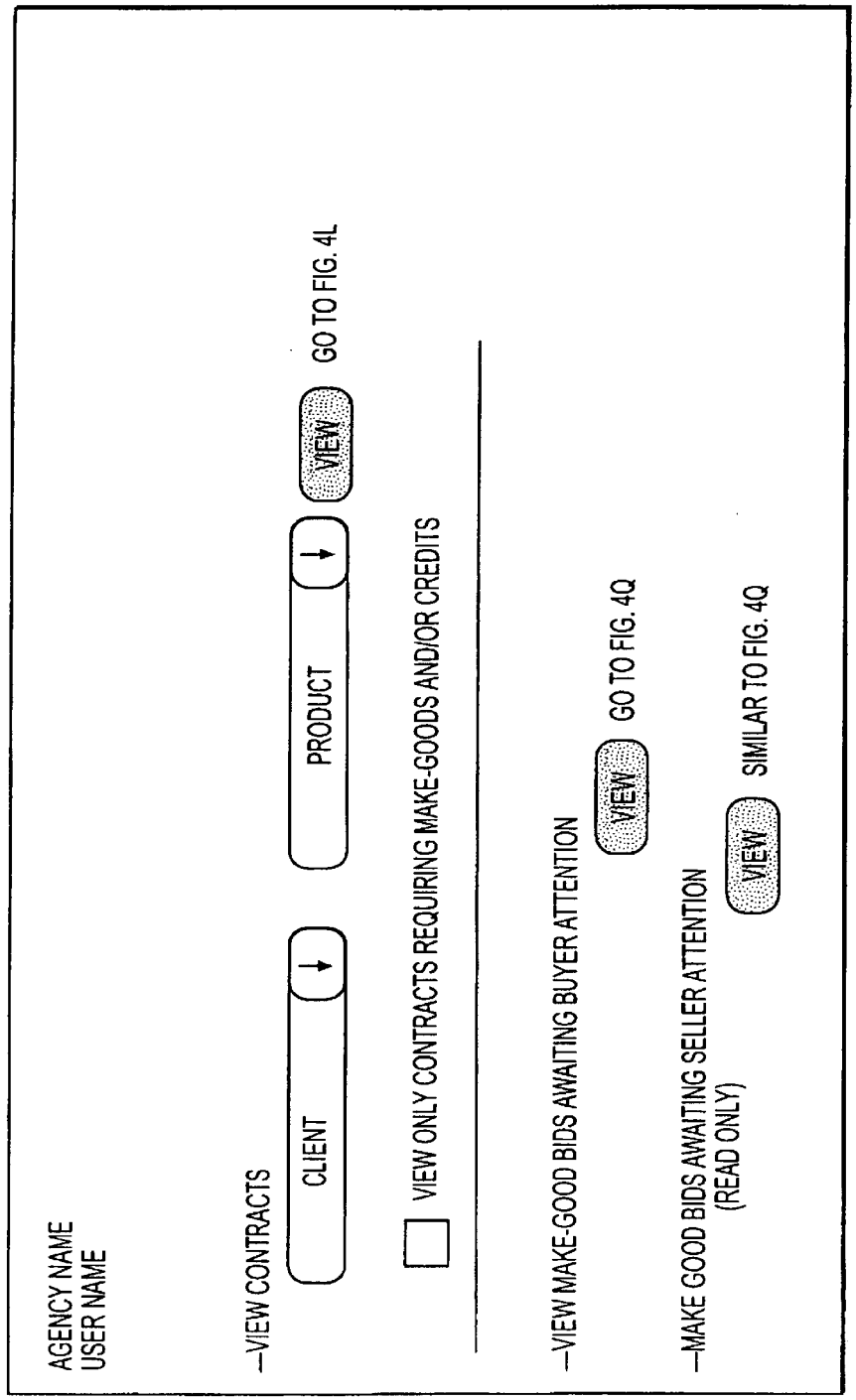
Figure 4M:
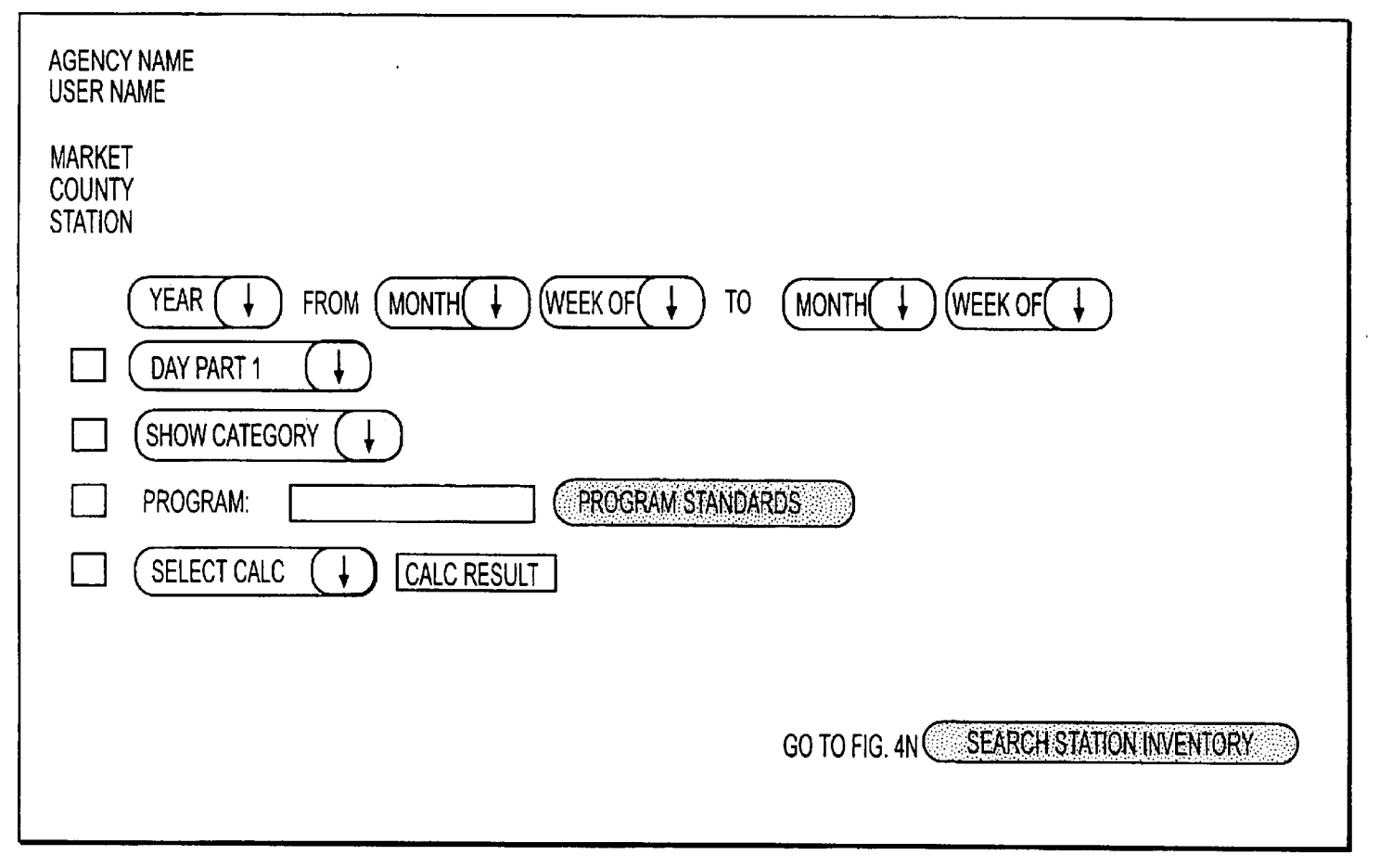
Figure 4N:
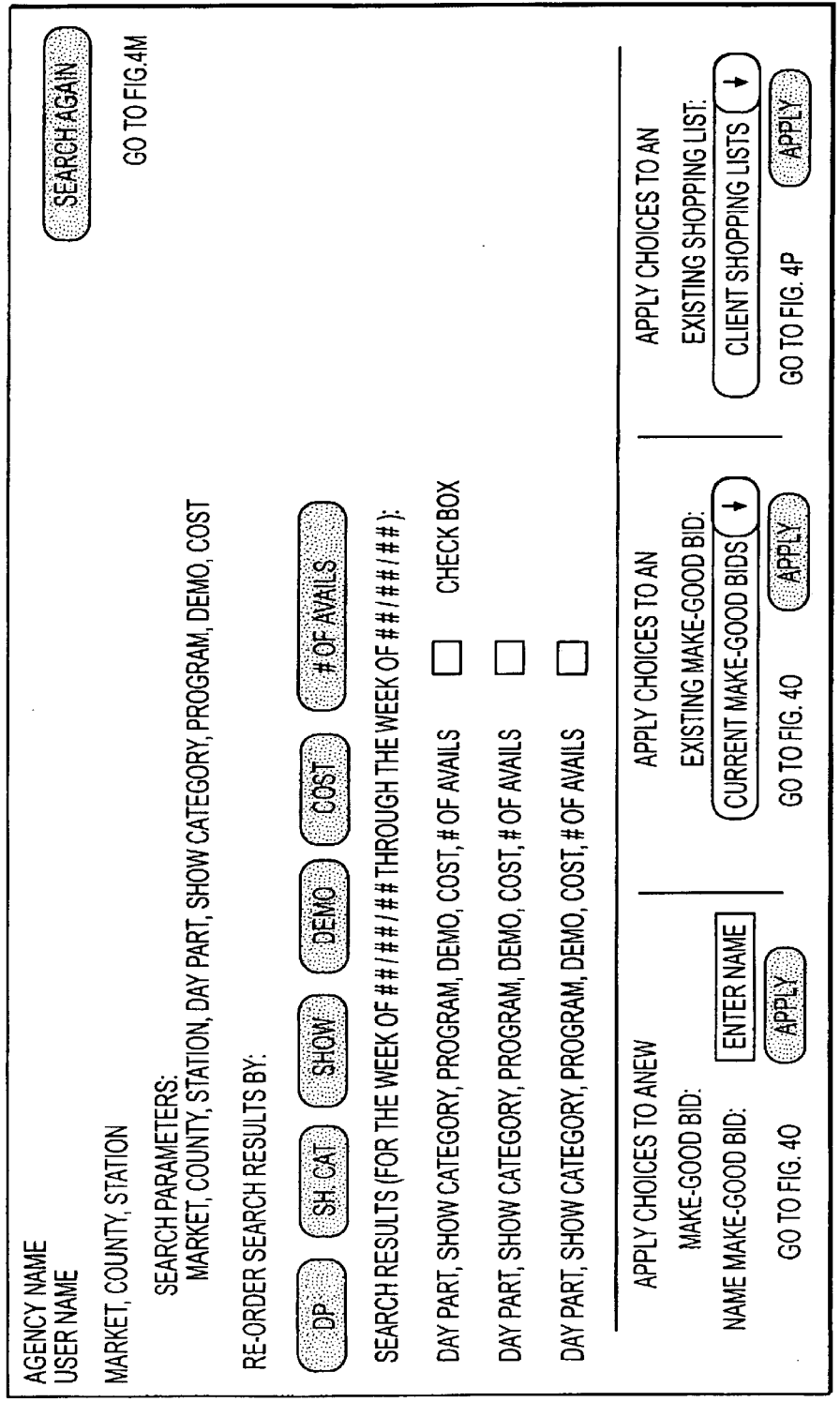
Figure 4O:
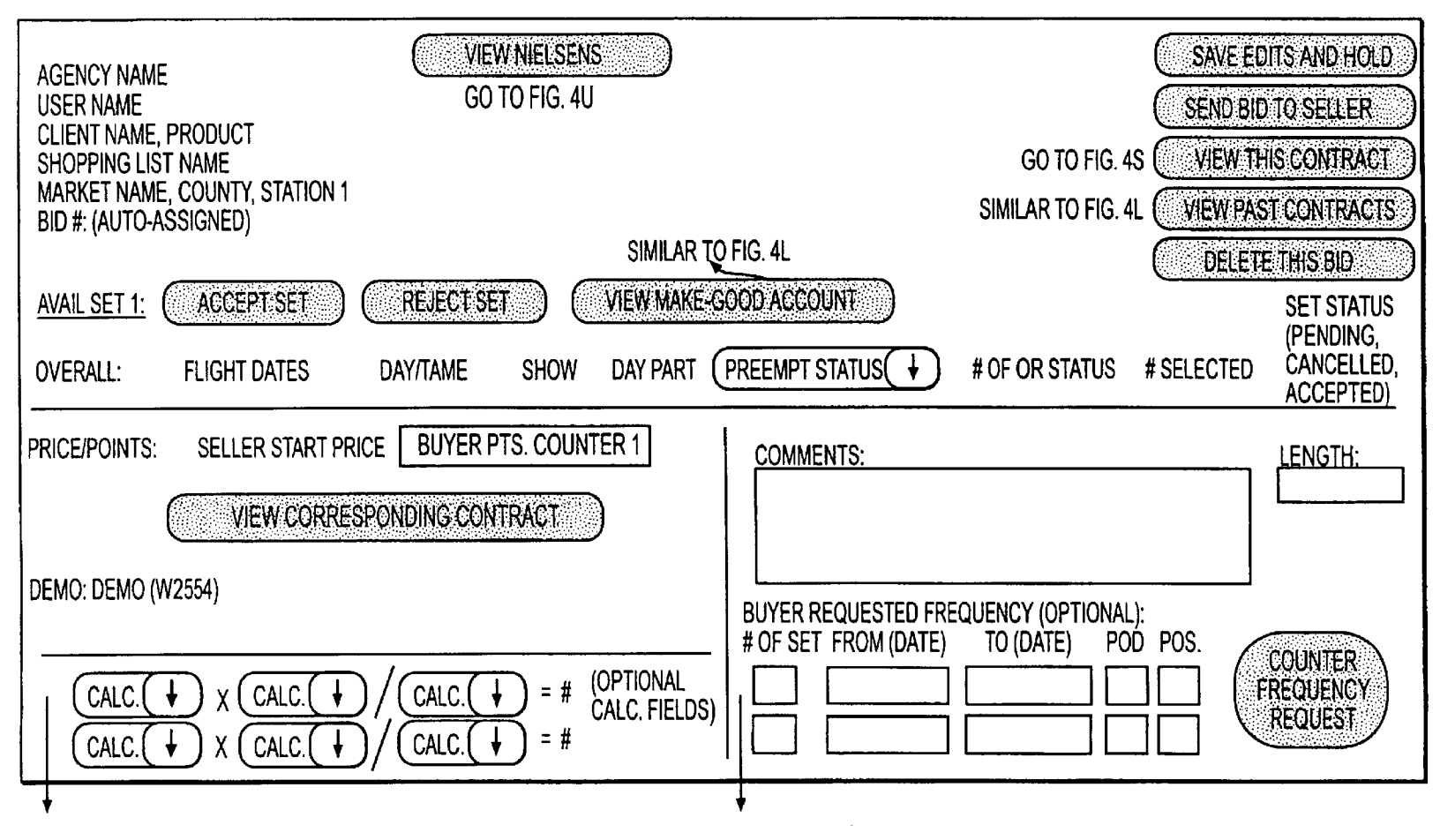
Figure 4P:
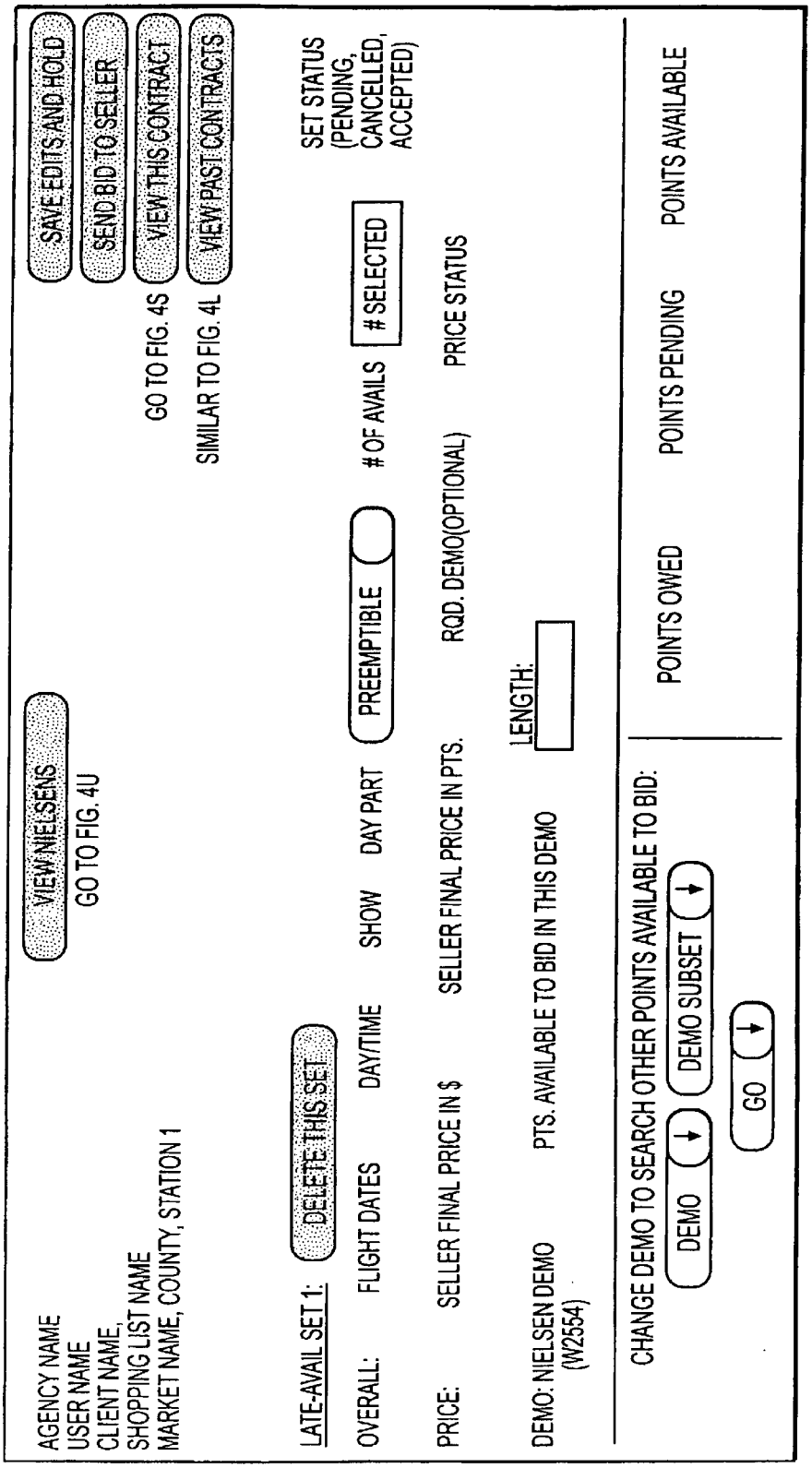

If the buyer wishes to view contracts and the status of the make-good account (see FIG. 4C), the buyer clicks on the corresponding icon and is brought to a display as shown in FIG. 4K. The buyer may view contracts by client or by product (FIG. 4L), or may view make-good bids awaiting either buyer attention or seller attention (FIG. 4Q). FIG. 4L shows an example of contracts listed by contract number and identifying flight dates, market codes, stations, and whether the contract represents points, credit, or share. The station inventory may be searched and applied to a make-good bid, as shown in FIG. 4M. The buyer inputs search parameter to search the station's inventory, and clicks on the "search" icon. FIG. 4Q shows make-good bids awaiting buyer attention. FIG. 4N shows the results from searching the station's inventory. The buyer then may choose a particular avail set to apply to either a new make-good bid, an existing make-good bid, or to an existing shopping list. FIG. 4O displays an interactive screen for preparing a make-good bid. The buyer views the seller's starting price and enters into the appropriate field the buyer's counteroffer. The buyer also may view the contract pertaining to the make-good credit. If the "late status" box is checked (FIGS. 4F, 4I), the buyer may view a late avail set for a bid to a seller, as shown in FIG. 4P. Late avail sets represent avails in the near future which have not been sold, and thus the seller has entered final prices for them (presumably significantly reduced from the seller's starting price. The buyer may send the bid on the late avail to the seller, or may delete the set and change the demographic code to search other avails to bid on.

FIG. 4R illustrates the details of a contract for which make-good credits are owed by a seller. FIG. 4S shows the details of a contract as sent to the buyer from the seller. The buyer may view the frequency details of the contract (as shown for example in FIG. 4T) by clicking on the corresponding icon. If the buyer agrees to the contract, the buyer indicates agreement and sends the contract to the seller by clicking on the "buyer agrees" and "send to seller" icons . A display also is provided for the buyer to enter a program name and date to view Nielsen rating data for that program, when the buyer has selected the "view Nielsen" icon from a display screen.

Seller Actions

Figure 5A:
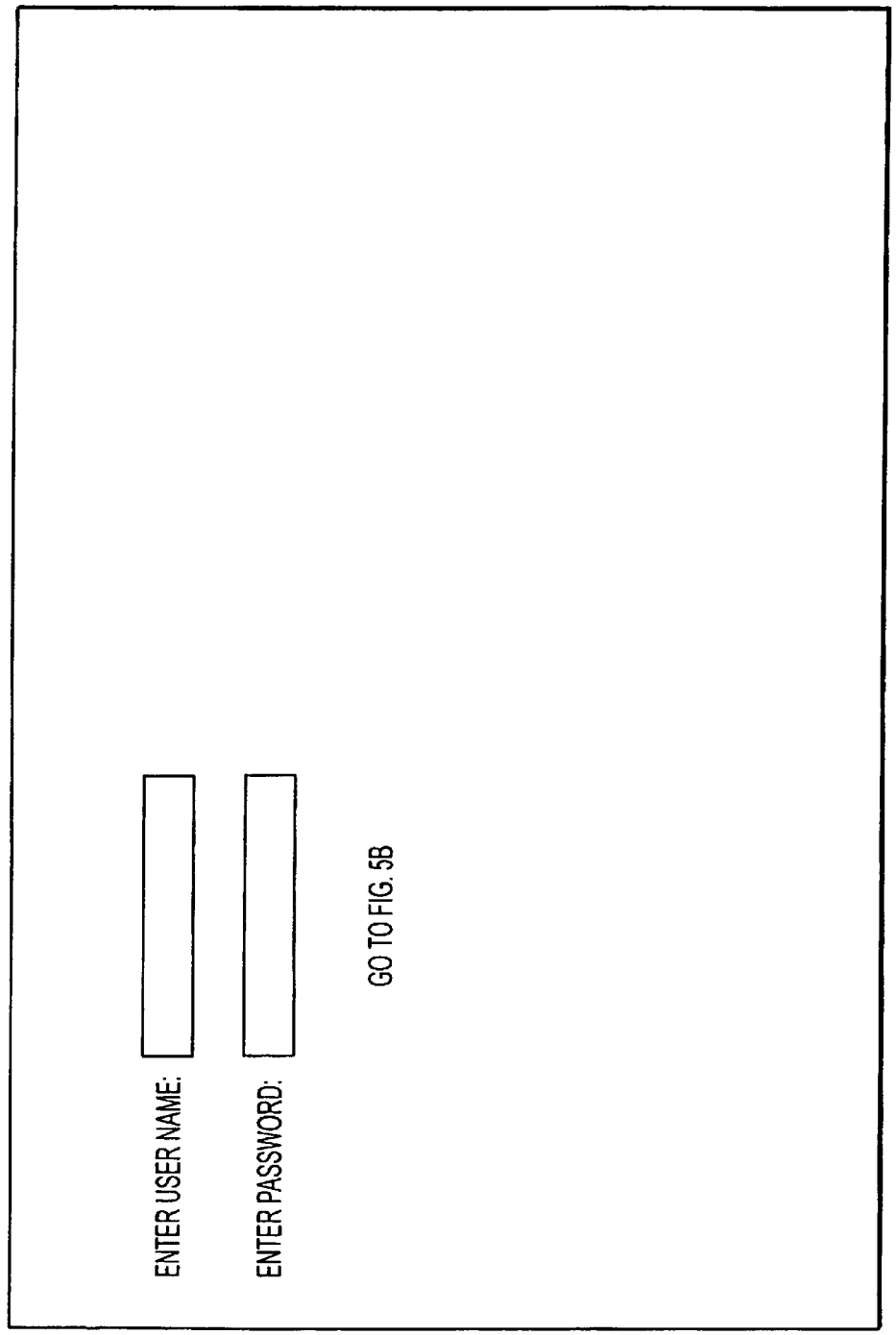
FIGS. 5A–5R are diagrams of seller process flows in the form of screen displays, according to one embodiment of the invention.
Figure 5B:
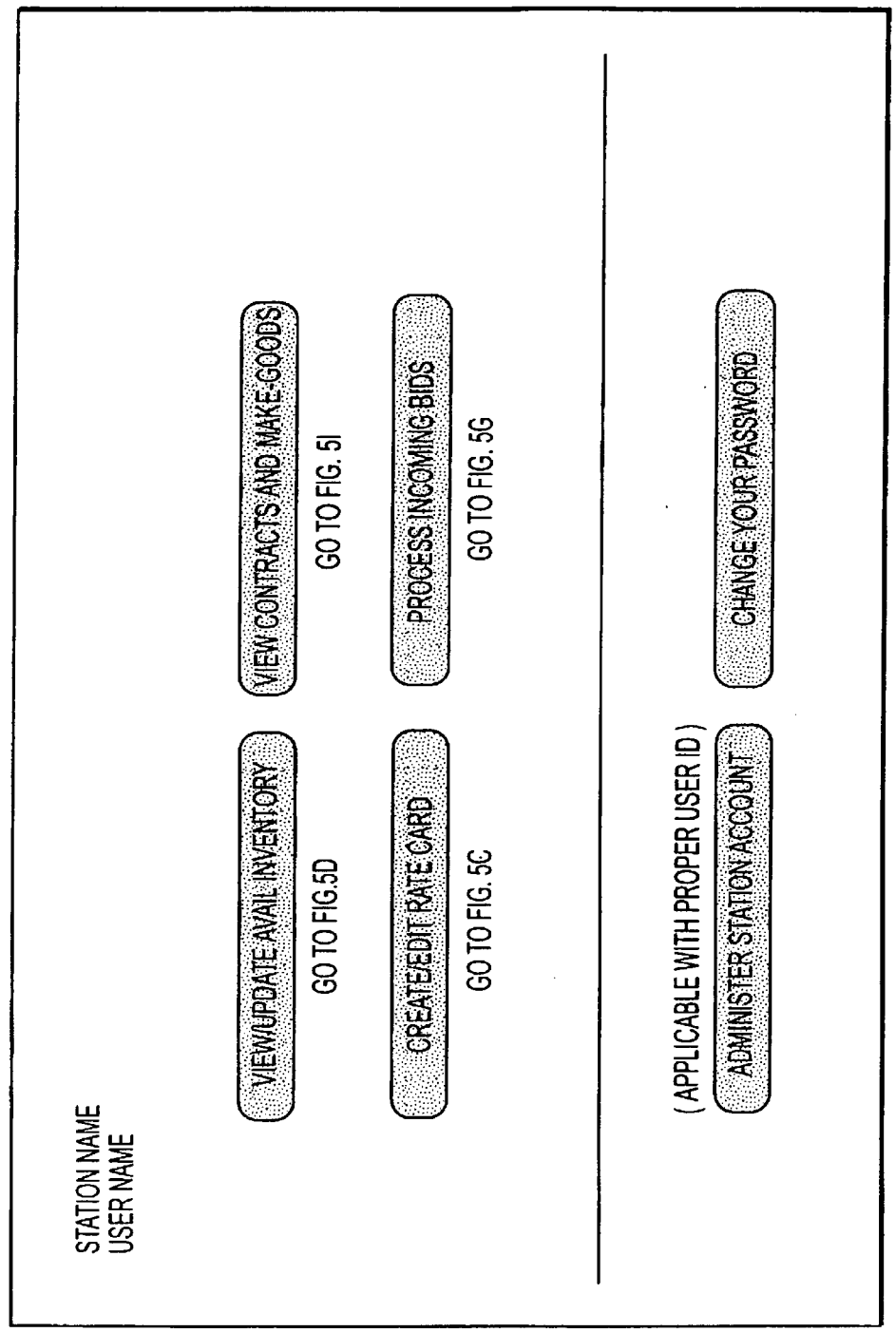

FIGS. 5A–5R illustrate interactive actions to be taken by a seller. After inputting the seller's user name and password in FIG. 5A, the seller is presented with the choices shown in FIG. 5B. The seller may view and update her avail inventory (FIG. 5D), may view contracts and make-goods owed to buyers (Fig. 5I), may create and edit rate cards (FIG. 5C), and may process incoming bids (FIG. 5G). The seller also may carry out account administration functions, and change her password from this screen.

Figure 5C:
Figure 5D:
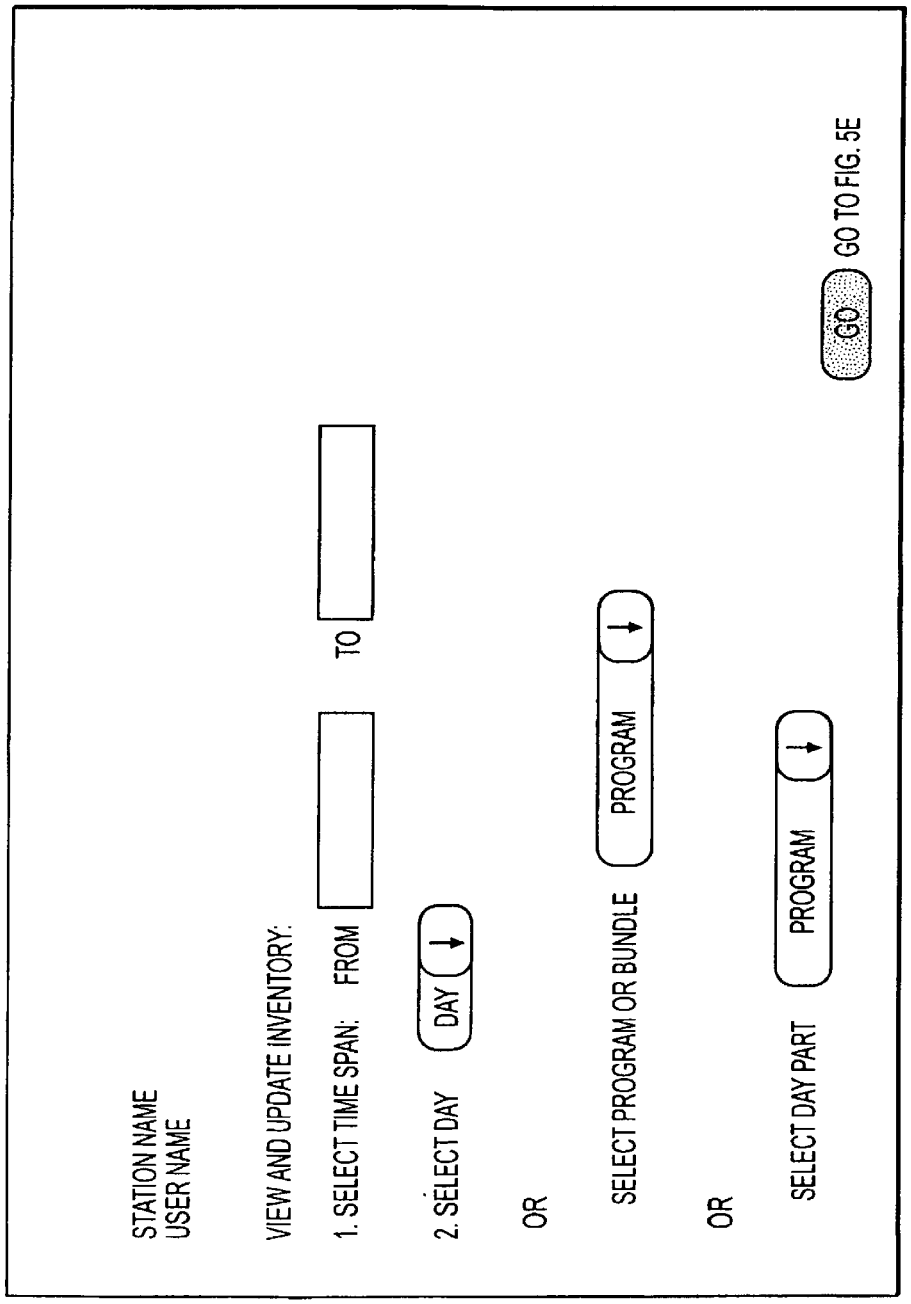

FIG. 5C illustrates a screen for the seller to create and edit rate cards. Each program indicates the day and time of its broadcast, the avail category (preemptable, preemptable with notification, or non-preemptable) and the price in the case of a late avail. As shown in FIG. 5D, the seller can view and update the seller's inventory by day and time span, or by program/bundle or daypart. Once the parameters are selected, the seller clicks on the "go" icon to be brought to the display of FIG. 5E. This screen shows the day(s) and showtime of specific programs, the preemptable rate, and the number of avails existing for each week of a specified time span. The seller also may store default schedules into the future and from those default schedules spawn parent and child lock-in schedules, once a programming schedule has been locked-in by the station. Avails then can be attached to or associated with lock-in parent or child schedules, and selectively released to the public-as desired by the seller as time goes by.

Specific avail sets may be edited as shown in FIG. 5F. This screen displays the prices for each avail category, the number of starting avails, the number of avails sold through the marketplace server (DR), the number of avails sold through other channels, and total avails remaining, in addition to number of bids pending. The seller may decide to show the number of avails or an avail status to buyers, and may select particular numbers of avails for the system to release either immediately or on selected dates. The seller may choose to show rates to the buyers or not, and may override a preset default rate.

Figure 5H:
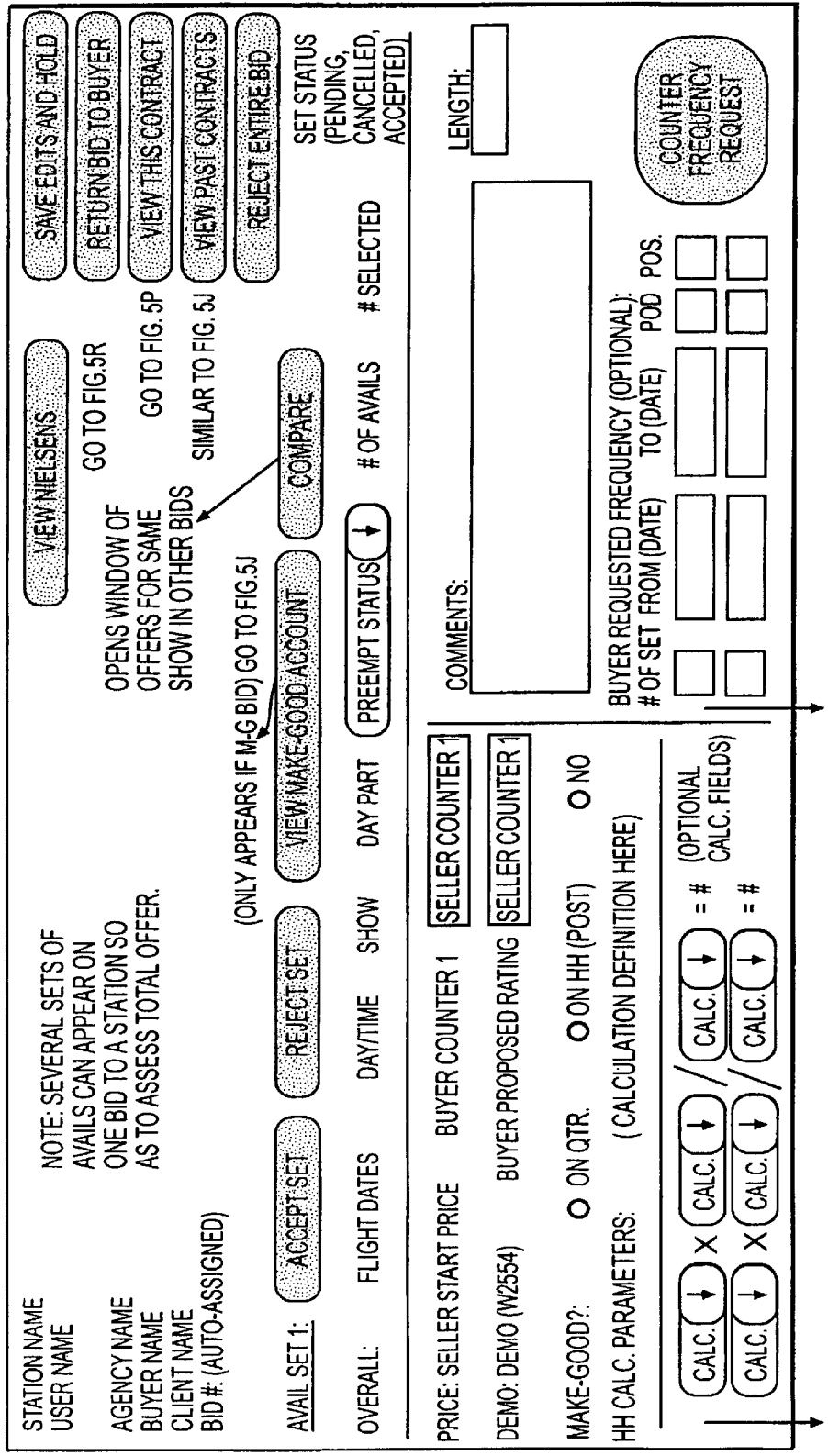

FIG. 5G illustrates incoming bids sent to the seller. A particular bid may be viewed by checking the appropriate field and clicking on the "view" icon, which takes the seller to FIG. 5H. FIG. 5H displays the bid information entered by the buyer as previously described (FIG. 4G). The seller may view the contract for the bid (FIG. 5P), view previous contracts (FIG. 5J), reject the bid, or accept the bid and return it to the buyer.

If the seller wishes to view contracts (FIG. 5I), the seller enters desired dates, and the resulting contracts will be shown as in FIG. 5J. The seller may select a contract to view its details, as shown in FIG. 5K. The contract may be selected according to various parameters such as buyer, product, campaign, etc.

Figure 5L:
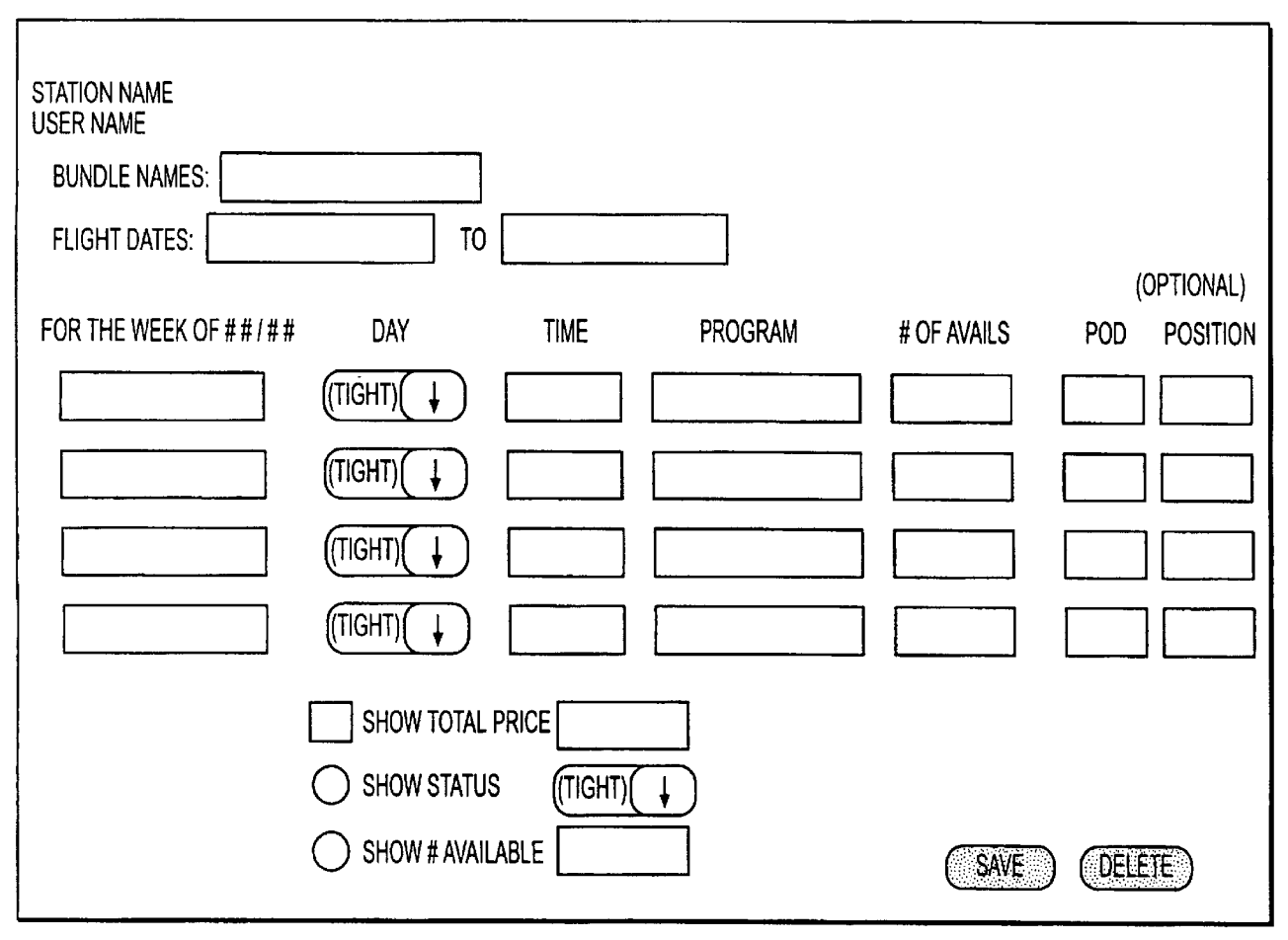
Figure 5O:
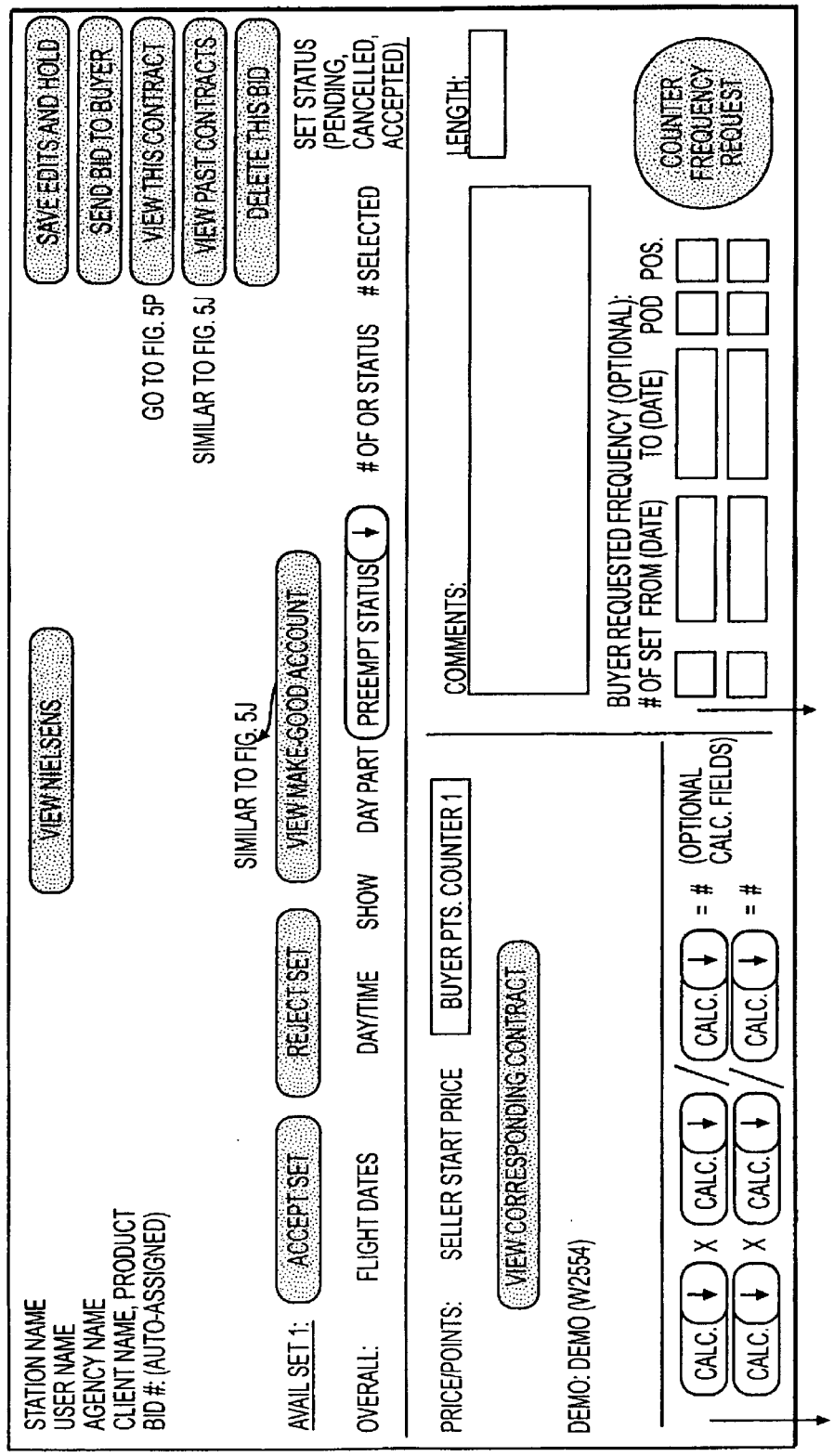

The seller may create a special bundle inventory (see FIG. 5E) by entering the program information as shown in FIG. 5L. The seller may offer make-goods by entering information to search the seller's inventory as shown in FIG. 5M. FIG. 5N illustrates the results of the inventory search. The seller may apply the results to a new makegood bid or to an existing make-good bid (FIG. 5O). FIG. 5O contains information similar to FIG. 4O as described above. FIG. 5P shows the details of the underlying contract pertaining to a particular make-good owed to a buyer, as explained above with reference to FIG. 4S. The seller may view the contract frequency details as shown in FIG. 5Q. FIG. 5R illustrates the display for a seller to enter information necessary to view the Nielsen rating data for a particular program.

Figure 6:
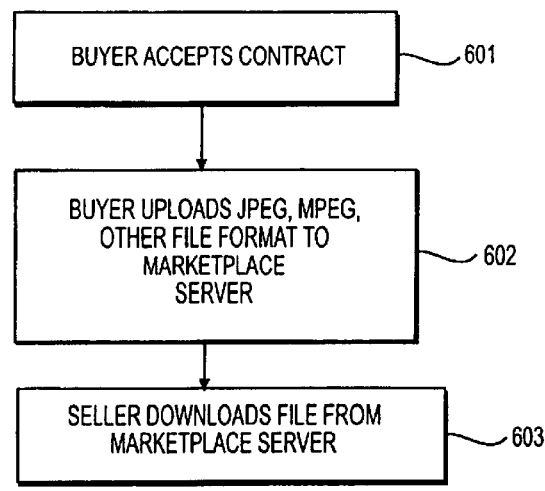
FIG. 6 is a flow diagram of process for automatically transferring advertisement content from a buyer to a seller in conjunction with the execution of a media purchase contract, according to the present invention.

FIG. 6 illustrates a process for automatically providing the seller with the buyer's commercial or advertising content once the buyer has accepted the seller's contract for an avail or avail set. At step 601, the buyer accepts the contract by selecting the appropriate screen display icon. At this point, the accounting system interface of the media marketplace server may interact on-line with the accounting systems of the buyer and seller to effect payment for the contract. At step 602, the buyer uploads the advertising or commercial content to the server 101. At step 603, when the seller views the accepted contract, the seller is able to download the buyer's content from the server 101, and integrate it into the seller's programming system for airing at the agreed upon time(s).

Figure 7:
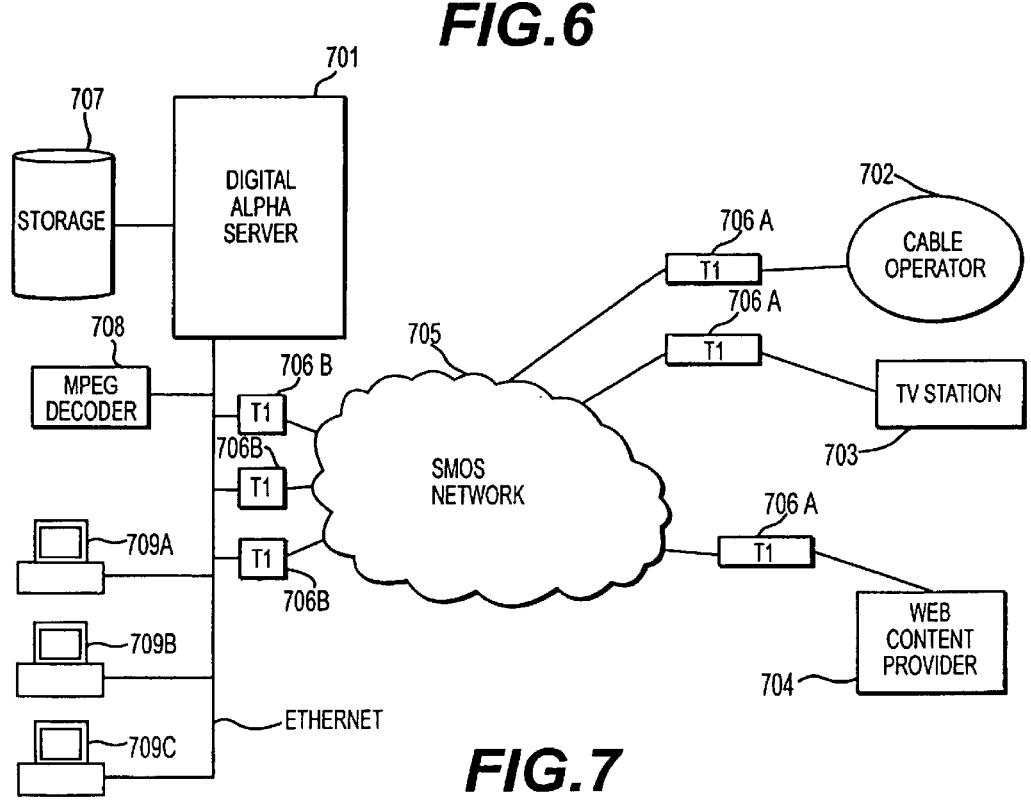
FIG. 7 is a block diagram of a digital delivery system for transferring advertising content according to one embodiment of the present invention.

FIG. 7 shows one example of a digital delivery system for the transfer of commercials or other advertising content between buyers and sellers according to the invention. A digital alpha server 701 is in communication with the equipment of various sellers, such as cable operator 702, TV station 703, or Web content provider 704, via SMOS network 705. Each of the sellers may have a high speed connection, such as T1 connections 706a, to the network. Additionally, the server 701 may have a number of high speed connections, such as T1 connections 706b, to the network. The server 701 is provided with a large memory storage device such as storage 707 for storing advertising content, and also is provided with a content viewer, such as MPEG decoder 708. A plurality of clients 709a–709c are connected to the server, either through a LAN or WAN device such as Ethernet, or through Internet connections. In operation, the stations 709a–709c enter advertising content into their systems, convert the content to digital format (such as MPEG files), and upload the content to the storage 707. Sellers 702–704 then are able to download the content from the storage 707 to their own systems via the SMOS network. Alternatively, the server 701 may upload the content to the sellers in conjunction with the transmission of accepted contracts.

The invention having been described, it will be apparent to those skilled in the art that the same may be varied in many ways without departing from the spirit and scope of the invention. Any and all such modifications are intended to be included in the scope of the following claims.

What is claimed is:

1. A method for buying and selling media advertising units over a distributed communication network, comprising the steps of:

providing a server on said network, said server including a database containing information pertaining to available advertising units in conjunction with specific media content provided by media content providers;

providing buyers of said advertising units access to said database over said network, whereby said buyers may enter desired search parameters into a search engine and receive search results indicating particular advertising units meeting the search criteria;

receiving bids on advertising units selected by buyers from said search, and communicating said bids to sellers of said advertising units; and providing sellers of said advertising units access to said database over said network, whereby said sellers may enter said information, receive bids entered by said buyers, accept said bids and enter contracts into said server for communication to said buyers over said network;

wherein said advertising units comprise time slots associated with television content and wherein said information includes program times, days of week, category according to defined time segments, and demographic viewer information.

2. The method of claim 1, wherein said server includes a make-good bank that accounts for credits owed to specific buyers as a result of unfulfilled contracts.

3. The method of claim 2, further comprising the step of retrieving information on fulfilled and unfulfilled advertising units, and crediting the buyer's make-good account for an unfulfilled advertising unit.

4. The method of claim 1, wherein said server includes a financial interface for interacting with accounting systems of said buyers and sellers over said network to settle contract payments.

5. The method of claim 1, further including the steps of receiving from buyers advertising content in digital form over said network, and transmitting to sellers over said network advertising content received from buyers.

6. A system for buying and selling media advertising units over a distributed communication network, comprising:

a server coupled to said network, said server including a database containing information with pertaining to available advertising units in conjunction with specific media content provided by media content providers;

advertising buyer stations coupled to said network, providing buyers of said advertising units access to said database over said network, whereby said buyers may enter desired search parameters into a search engine and receive search results indicating particular advertising units meeting the search criteria;

said server receiving bids on advertising units selected by buyers from said search, and communication said bids to sellers of said advertising units; and advertising seller stations coupled to said network, providing sellers of said advertising units access to said database over said network, whereby said sellers may enter said information, receive bids entered by said buyers, accept said bids, and enter contracts into said server for communication to said buyers over said network;

wherein said advertising units comprise advertising time slots associated with television content and wherein said information includes program times, days of week, category according to defined time segments, and demographic viewer information.

7. The system of claim 6, wherein said server includes a make-good bank that accounts for credits owed to specific buyers as a result of unfulfilled contracts.

8. The system of claim 6, wherein said server includes a financial interface for interacting with accounting systems of said buyers and sellers over said network to settle contract payments.

9. The system of claim 6, further including means for receiving from buyers advertising content in digital form over said network, and transmitting to sellers over said network advertising content received from buyers.

10. A method for buying and selling media advertising units over a distributed communication network, comprising the steps of:

providing a server on said network, said server including a database containing information pertaining to available advertising units in conjunction with specific media content provided by media content providers;

providing buyers of said advertising units access to said database over said network, whereby said buyers may view particular advertising units for sale by sellers;

receiving bids on advertising units selected by buyers, and communication said bids to sellers of said advertising units; and providing sellers of said advertising units access to said database over said network, whereby said sellers may enter said information, receive bids entered by said buyers, accept said bids, and enter contracts into said server for communication to said buyers over said network;

wherein said advertising units comprise advertising time slots associated with television content and wherein said information includes program times, days of week, category according to defined time segments, and demographic viewer information.

11. A method for bidding on available advertising units via a distributed communication network, comprising the steps of:

creating a primary search profile including at least one of a plurality of search criteria; transmitting an instruction to apply the search profile to a data base having available advertising units;

receiving a list of a plurality of available advertising units meeting said search profile, and storing said list as a shopping list; and transmitting an instruction to bid for at least one of the available advertising units in the shopping list;

wherein said advertising units comprise advertising time slots associated with television content and wherein said information includes program times, days of week, category according to defined time segments, and demographic viewer information.

12. A method for selling advertising units via a distributed communication network, comprising the steps of:

specifying information about a plurality of available advertising units, each of said available advertising units corresponding to an advertising slot;

transmitting an instruction to store the specified information in a data base having available advertising units; receiving a bid for at least one of a plurality of available advertising units; reviewing the bid; and transmitting an acceptance of the bid of specified criteria are met, otherwise transmitting a rejection of the bid;

wherein said advertising units comprise advertising time slots associated with television content and wherein said information includes program times, days of week, category according to defined time segments, and demographic viewer information.

13. A computerized system for bidding on available advertising units via a distributed communication network; comprising:

primary search profile data including at least one of a plurality of search criteria;

a search instruction, responsive to a user command, indicating that the primary search profile is to be applied to a data base having a plurality of available advertising units;

a list of a plurality of available advertising units meeting said search profile, received in response to said instructions, stored as a shopping list;

and a bidding instruction, responsive to a user command, to bid for at least one of the available advertising units in the shopping list;

wherein said advertising units comprise advertising time slots associated with television content and wherein said information includes program times, days of week, category according to defined time segments, and demographic viewer information.

14. A computerized system for selling advertising units via a distributed communication network, comprising:

locally shared information about a plurality of available advertising units, each of said available advertising units corresponding to an advertising slot;

an instruction, responsive to a user, to store the specified information in a remote database having available advertising units; an acceptance instruction, responsive to a received bid for at least one of a plurality of available advertising units, if specified criteria are met, advising of acceptance of the bid; and a rejection instruction, responsive to the received bid, if specified criteria are not met, advising of rejection of the bid;

wherein said advertising units comprise advertising time slots associated with television content and wherein said information includes program times, days of week, category according to defined time segments, and demographic viewer information.

* * * * *